US008892089B2

(12) United States Patent  
Nitta et al.

(10) Patent No.: US 8,892,089 B2
(45) Date of Patent: Nov. 18, 2014

(54) COMMUNICATIONS SYSTEM, BASE STATION APPARATUS, AND COMMUNICATION METHOD

(75) Inventors: Daisuke Nitta, Kawasaki (JP); Yuki Shinada, Kawasaki (JP); Kazunari Kobayashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 663 days.

(21) Appl. No.: 13/039,091

(22) Filed: Mar. 2, 2011

(65) Prior Publication Data

US 2011/0275362 A1  Nov. 10, 2011

(30) Foreign Application Priority Data

May 6, 2010 (JP) ................... 2010-106171

(51) Int. Cl.
*H04W 4/00* (2009.01)
*H04W 76/04* (2009.01)
*H04W 76/02* (2009.01)
*H04W 76/06* (2009.01)

(52) U.S. Cl.
CPC ............ *H04W 76/04* (2013.01); *H04W 76/025* (2013.01); *H04W 76/028* (2013.01); *H04W 76/041* (2013.01); *H04W 76/064* (2013.01)
USPC ...................... 455/422.1; 455/435.2; 455/448; 455/561

(58) Field of Classification Search
USPC ........................................ 455/435.2, 448, 561
See application file for complete search history.

(56) References Cited

U.S. PATENT DOCUMENTS 5,959,971 A  9/1999  Sakai

| 2008/0130581 | A1* | 6/2008 | Hwang et al. ................. 370/331 |
| 2009/0117876 | A1 | 5/2009 | Inoue |
| 2009/0253426 | A1* | 10/2009 | Qiu et al. .................... 455/426.1 |
| 2009/0280812 | A1* | 11/2009 | Cheng et al. ................. 455/436 |
| 2010/0074121 | A1 | 3/2010 | Sakama |
| 2011/0171902 | A1 | 7/2011 | Toyoda et al. |

FOREIGN PATENT DOCUMENTS

| EP | 1863237 | 12/2007 |
| EP | 2114094 | 11/2009 |
| JP | 09-064809 | 3/1997 |
| JP | 2001-224054 | 8/2001 |
| JP | 2007-135052 | 5/2007 |

(Continued)

OTHER PUBLICATIONS

Office Action issued for corresponding Japanese Patent Application No. 2010-106171, issued on Jun. 4, 2013, with partial English translation.

(Continued)

*Primary Examiner* — Patrick Edouard
*Assistant Examiner* — Matthew Genack
(74) *Attorney, Agent, or Firm* — Myers Wolin, LLC

(57) ABSTRACT

In a communication system, an upper-level carrier has communication functions for both first and second sessions. A first communication unit communicates with the upper-level carrier through a first communication session established therewith. A second communication unit communicates with the upper-level carrier through a second communication session established therewith. A communication control unit controls the first and second communication units. The communication control unit disconnects the first communication session and directs a signal intended for the first communication session to the second communication session, so that the signal is delivered to the upper-level carrier by using the second communication session as a detour.

10 Claims, 30 Drawing Sheets

(56) References Cited

FOREIGN PATENT DOCUMENTS

| | | |
|---|---|---|
| JP | 2008-099137 | 4/2008 |
| JP | 2009-105739 | 5/2009 |
| JP | 2010-016602 | 1/2010 |
| JP | 2010-074594 | 4/2010 |
| WO | 2006/012018 | 2/2006 |
| WO | 2006/090266 | 8/2006 |
| WO | 2008/120297 | 10/2008 |
| WO | 2008/146394 | 12/2008 |
| WO | 2009/129516 | 10/2009 |
| WO | 2010/044142 | 4/2010 |

OTHER PUBLICATIONS

Extended European Search Report for corresponding European Patent Application No. 11157385.3 dated Jul. 19, 2011.

Alcatel-Lucent, "E-UTRAN architecture for the Home eNode B", 3GPP TSG RAN WG3 Meeting #59bis, Shenzhen, China, Mar. 31-Apr. 3, 2008. [Ref.: EESR dated Jul. 19, 2011].

Japanese Office Action for corresponding Japanese Patent Application No. 2010-106171, issued Dec. 10, 2013, with partial English translation.

\* cited by examiner

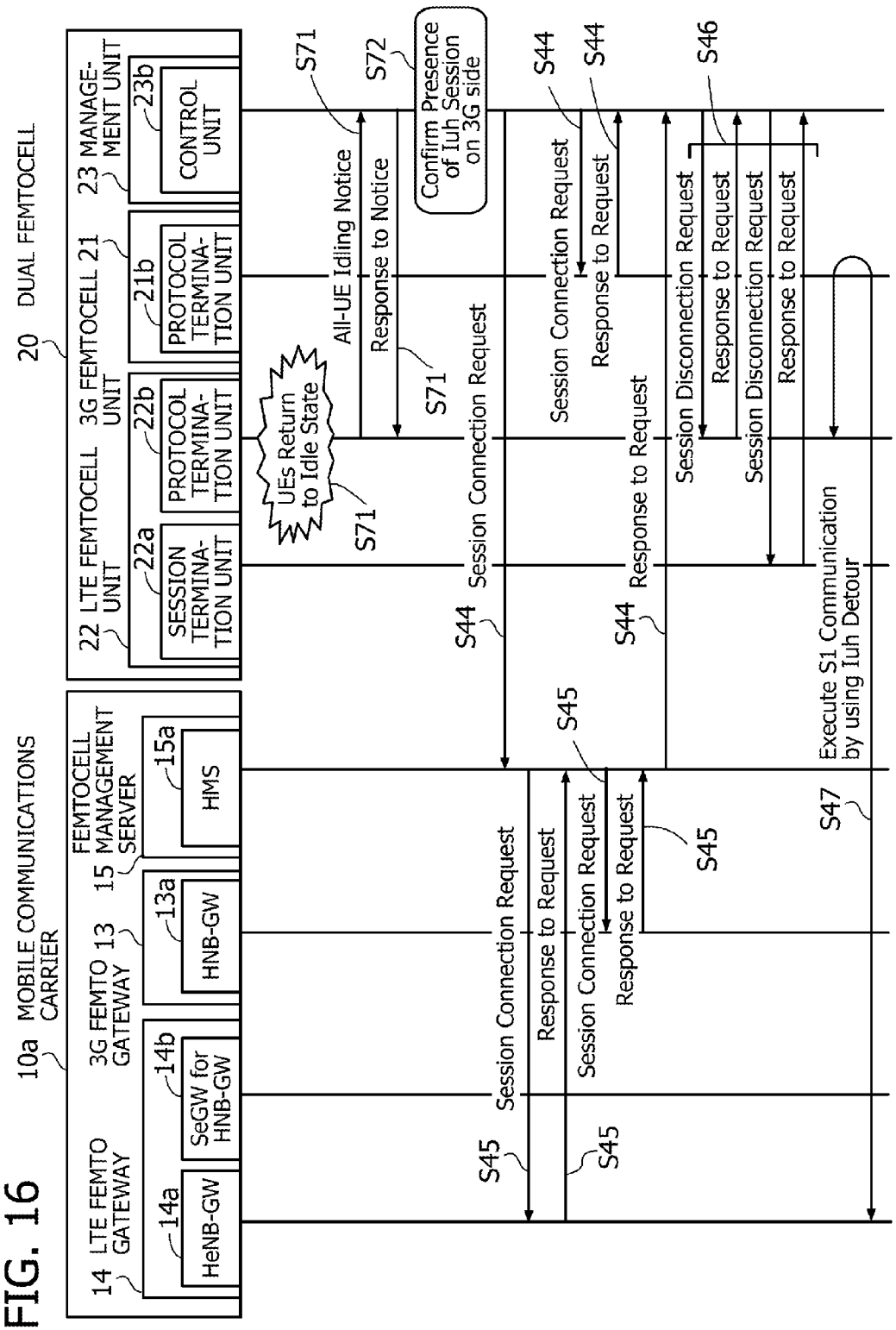

FIG. 17 m1 SETUP COMPLETION NOTICE MESSAGE

| DATA FIELD | VALUE (EXAMPLE) |
|---|---|
| Message Name | Setup Completion Notice |
| Source Node Name | Selected from the following:<br>•3G Femtocell<br>•LTE Femtocell |
| Femtocell-side Connection Data | Include connection setup data of Femtocell (IP Address, Port Number, Point Code of SCTP, TEID of GTP-U, etc) as much as necessary |
| Femto GW-side Connection Data | Include connection setup data of Femto Gateway (IP Address, Port Number, Point Code of SCTP, TEID of GTP-U, etc) as much as necessary | m1r RESPONSE MESSAGE OF SETUP COMPLETION NOTICE

| DATA FIELD | VALUE (EXAMPLE) |
|---|---|
| Message Name | Response to Setup Completion Notice |
| Source Node Name | Management Unit |
| Connection Result | Done or Failed |

FIG. 19 m2 SESSION CONNECTION REQUEST MESSAGE

| DATA FIELD | VALUE (EXAMPLE) |
|---|---|
| Message Name | Session Connection Request |
| Disrupted Node Name | Selected from the following:<br>• HMS<br>• Management Unit |
| Femtocell-side Connection Data | Include connection setup data of Femtocell (IP Address, Port Number, Point Code of SCTP, TEID of GTP-U, etc) as much as necessary |
| Femto GW-side Connection Data | Include connection setup data of Femto Gateway (IP Address, Port Number, Point Code of SCTP, TEID of GTP-U, etc) as much as necessary |

FIG. 20 m2r RESPONSE MESSAGE OF SESSION CONNECTION REQUEST

| DATA FIELD | VALUE (EXAMPLE) |
|---|---|
| Message Name | Response to Session Connection Request |
| Source Node Name | Sender's own node name selected from the following:<br>•HeNB-GW<br>•HNB-GW<br>•3G Femtocell<br>•LTE Femtocell<br>•HMS |
| Connection Result | Done or Failed |

FIG. 21 m3　SESSION DISCONNECTION REQUEST MESSAGE

| DATA FIELD | VALUE (EXAMPLE) |
|---|---|
| Message Name | Session Disconnection Request |
| Transmit Node Name | Selected from the following:<br>・Management Unit<br>・HMS |
| Femtocell-side Connection Data | Include connection setup data of Femtocell (IP Address, Port Number, Point Code of SCTP, TEID of GTP-U, etc) as much as necessary |
| Femto GW-side Connection Data | Include connection setup data of Femto Gateway (IP Address, Port Number, Point Code of SCTP, TEID of GTP-U, etc) as much as necessary |

FIG. 22 m3r  RESPONSE MESSAGE OF SESSION DISCONNECTION REQUEST

| DATA FIELD | VALUE (EXAMPLE) |
| --- | --- |
| Message Name | Response to Session Disconnection Request |
| Source Node Name | Sender's own node name selected from the following:<br>•HeNB-GW<br>•HNB-GW<br>•3G Femtocell<br>•LTE Femtocell<br>•HMS |
| Connection Result | Done or Failed |

FIG. 23 m4 — UE CALL CONNECTION START NOTICE MESSAGE

| DATA FIELD | VALUE (EXAMPLE) |
|---|---|
| Message Name | UE Call Connection Start Notice |
| Transmit Node Name | Selected from the following:<br>• 3G Femtocell<br>• LTE Femtocell |
| Femtocell-side Connection Data | Include connection setup data of Femtocell (IP Address, Port Number, Point Code of SCTP, TEID of GTP-U, etc) as much as necessary |
| Femto GW-side Connection Data | Include connection setup data of Femto Gateway (IP Address, Port Number, Point Code of SCTP, TEID of GTP-U, etc) as much as necessary |

FIG. 24 m4r — RESPONSE MESSAGE OF UE CALL CONNECTION INITIATION

| DATA FIELD | VALUE (EXAMPLE) |
|---|---|
| Message Name | Response to UE Call Connection Start Notice |
| Source Node Name | Management Unit |
| Connection Result | Done or Failed |

FIG. 25 m5　ALL-UE IDLING NOTICE MESSAGE

| DATA FIELD | VALUE (EXAMPLE) |
|---|---|
| Message Name | All-UE Idling Notice |
| Transmit Node Name | Selected from the following:<br>・3G Femtocell<br>・LTE Femtocell |
| Femtocell-side Connection Data | Include connection setup data of Femtocell (IP Address, Port Number, Point Code of SCTP, TEID of GTP-U, etc) as much as necessary |
| Femto GW-side Connection Data | Include connection setup data of Femto Gateway (IP Address, Port Number, Point Code of SCTP, TEID of GTP-U, etc) as much as necessary |

FIG. 26 m5r  RESPONSE MESSAGE OF ALL-UE IDLING NOTICE

| DATA FIELD | VALUE (EXAMPLE) |
|---|---|
| Message Name | Response To All-UE Idling Notice |
| Source Node Name | Management Unit |
| Connection Result | Done or Failed |

FIG. 27 m6 TR-069 INFORM MESSAGE

| DATA FIELDS | VALUE (EXAMPLE) |
| --- | --- |
| DeviceId | Device ID of 3G-LTE Dual Femtocell |
| Event | 4 (Value Change), etc |
| MaxEnvelopes | 1 (Fixed) |
| CurrentTime | Transmit Date and Time |
| RetryCount | Any value |
| ParameterList | Specify one of the following data formats:<br>・Session Connection Request<br>・Response to Session Connection Request<br>・Session Disconnection Request<br>・Response to Session Disconnection Request |

TR - 069

COMMUNICATIONS SYSTEM, BASE STATION APPARATUS, AND COMMUNICATION METHOD

CROSS-REFERENCE TO RELATED APPLICATIONS

This application is based upon and claims the benefit of priority of the prior Japanese Patent Application No. 2010-106171, filed on May 6, 2010 the entire contents of which are incorporated herein by reference.

FIELD

The embodiments discussed herein relate to a communications system that performs data communication, as well as to a base station apparatus and communication method therefor.

BACKGROUND

Third generation (3G) mobile communications systems using wideband code-division multiple access (W-CDMA) techniques have rapidly gained popularity, and their outdoor population coverage has reached almost 100 percent. Their indoor population coverage, on the other hand, is not so high as the outdoor coverage because of the presence of obstacles to radio propagation and additional operating cost of indoor base stations.

Recent years have seen an increased interest in miniature radio base stations called "femtocells." Femtocells are suitable for use in home and office environments, and many of them are designed on the basis of 3G technology. For example, a femtocell enables about four users within several tens of meters to enjoy communication services simultaneously.

Femtocells may be deployed in high-rise buildings and residential towns to enhance the indoor coverage of mobile services without having significant impact on the cost of operations. In addition to 3G femtocells noted above, femtocells adapted to the Long Term Evolution (LTE) standard have also been developed, which are sometimes referred to as 3.9G systems.

To make call connection, 3G femtocells establish Iuh sessions to their upper-level network device. Similarly, LTE femtocells establish S1 sessions for call connection to their upper-level network device.

One proposed technique enables a miniature radio base station to obtain an encryption key for authentication of a terminal device attempting connection to the base station (see Japanese Laid-open Patent Publication No. 2009-105739). According to another proposed technique, a femtocell accepts a session switching request from a mobile terminal. In response, the femtocell assigns other base station to the requesting mobile terminal and then commands the mobile terminal to release its radio connection to the femtocell (see Japanese Laid-open Patent Publication No. 2010-16602).

Femtocells may be designed to support both 3G and LTE technologies. Such femtocells are referred to as dual femtocells. To handle both 3G and LTE communication protocols, a dual femtocell establishes Iuh and S1 sessions with 3G and LTE security gateways (SeGW), respectively. This means that dual femtocells consume twice as many sessions as standard femtocells do.

Security gateways are upper-level network nodes that provide secure communication between two networks that use different protocols. In general, encrypted communication functions such as the Security Architecture for Internet Protocol (IPsec) are implemented in security gateways. Security gateways are located in the carrier's premises and serve a plurality of femtocells via a network.

The number of sessions established with security gateways is expected to increase during the period of transition from 3G technology to LTE technology. A single security gateway, however, can only provide a limited number of sessions. Dual femtocells have thus to be managed properly, not to establish unnecessary sessions with security gateways. When, for example, only 3G service (or only LTE service) is actually used in a dual femtocell, keeping both 3G and LTE sessions alive is not only wasting resources, but also imposing extra load on the security gateways and dual femtocell.

SUMMARY

According to an aspect of the invention, there is provided a communication system including an upper-level carrier and a base station apparatus. The upper-level carrier has communication functions for a first communication session and a second communication session. The base station apparatus includes a first communication unit to communicate with the upper-level carrier through the first communication session established therewith, a second communication unit to communicate with the upper-level carrier through the second communication session established therewith, and a communication control unit to control the first communication unit and the second communication unit. The communication control unit disconnects the first communication session and directs a signal intended for the first communication session to the second communication session, so that the signal is delivered to the upper-level carrier by using the second communication session as a detour.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 16 is a sequence diagram illustrating disconnection of an S1 session when all subordinate UEs have returned to idle state;

FIG. 17 illustrates a data format of a setup completion notice;

FIG. 19 illustrates a data format of a session connection request;

FIG. 20 illustrates a data format of a response to a session connection request;

FIG. 21 illustrates a data format of a session disconnection request;

FIG. 22 illustrates a data format of a response to a session disconnection request;

FIG. 23 illustrates a data format of a UE call connection start notice;

FIG. 24 illustrates a data format of a response to a UE call connection start notice;

FIG. 25 illustrates a data format of an all-UE idling notice;

FIG. 26 illustrates a data format of a response to an all-UE idling notice;

FIG. 27 illustrates a data format of control messages;

DESCRIPTION OF EMBODIMENTS

Figure 1:
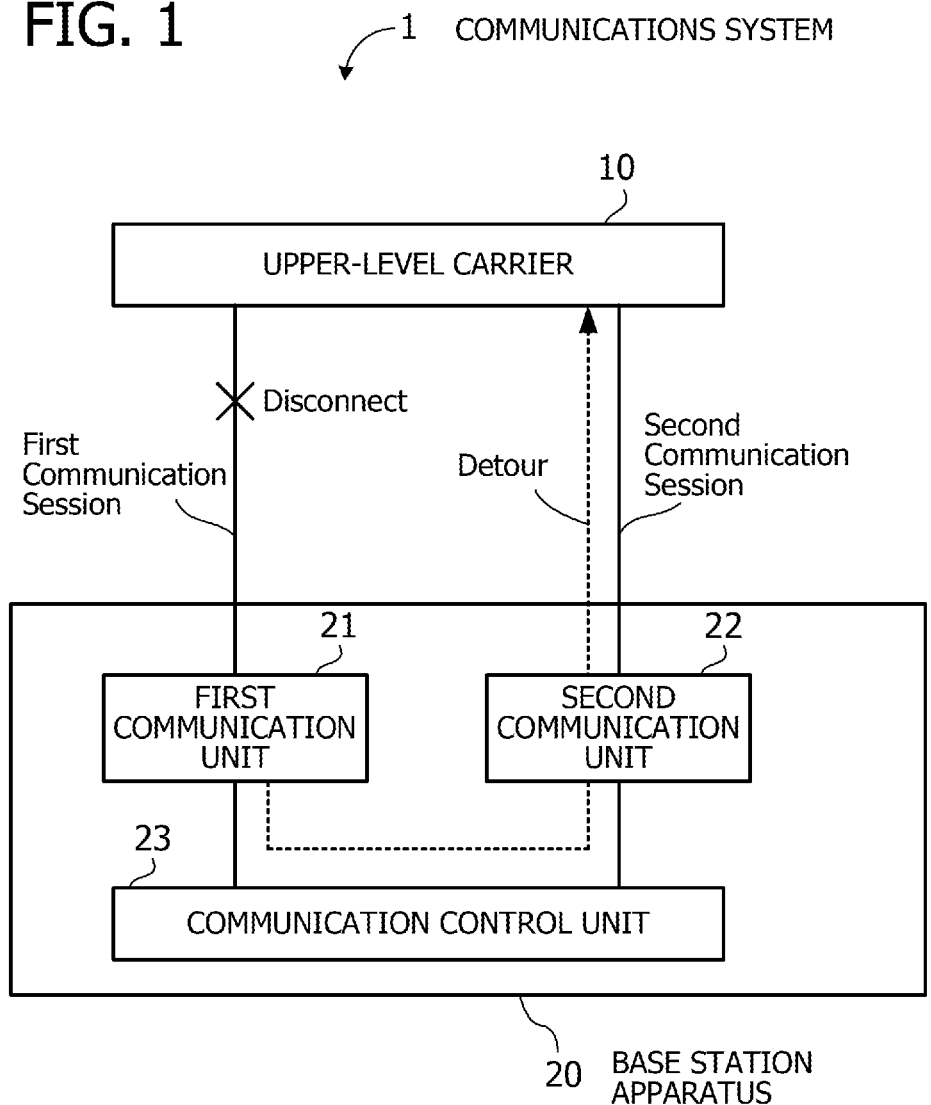
FIG. 1 illustrates an example structure of a communications system.

Preferred embodiments of the present invention will be described below with reference to the accompanying drawings, wherein like reference numerals refer to like elements throughout. FIG. 1 illustrates an example structure of a communications system. The illustrated communications system 1 includes an upper-level carrier 10 and a base station apparatus 20. The base station apparatus 20 includes a first communication unit 21, a second communication unit 22, and a communication control unit 23.

The upper-level carrier 10 has communication functions for both first and second sessions. The first communication unit 21 communicates with the upper-level carrier 10 through a first communication session established therewith. The second communication unit 22 communicates with the upper-level carrier 10 through a second communication session established therewith.

The communication control unit 23 controls the base station apparatus 20 as a whole, including operation of the first and second communication units 21 and 22 coupled to itself. For example, the communication control unit 23 disconnects the first communication session after the apparatus is started up or when radio communication devices (e.g., mobile phones) under the first communication session are in an idle state. The communication control unit 23 directs a signal intended for the first communication session to the second communication session, so that the signal is delivered to the upper-level carrier 10 by using the second communication session as a detour.

The signal from the first communication unit 21 is originally supposed to reach the upper-level carrier 10 via a first communication session. The signal, however, cannot be delivered via that original path because of disconnection of the first communication session. For this reason, the signal intended for the first communication session is sent to the second communication unit 22 according to a command from the communication control unit 23, and it is then tunneled to the upper-level carrier 10 through a second communication session.

The above-described communications system 1 may be implemented as a radio communications system that supports both 3G and LTE technologies. The following section will describe the structure and operation of such a radio communications system.

Figure 2:
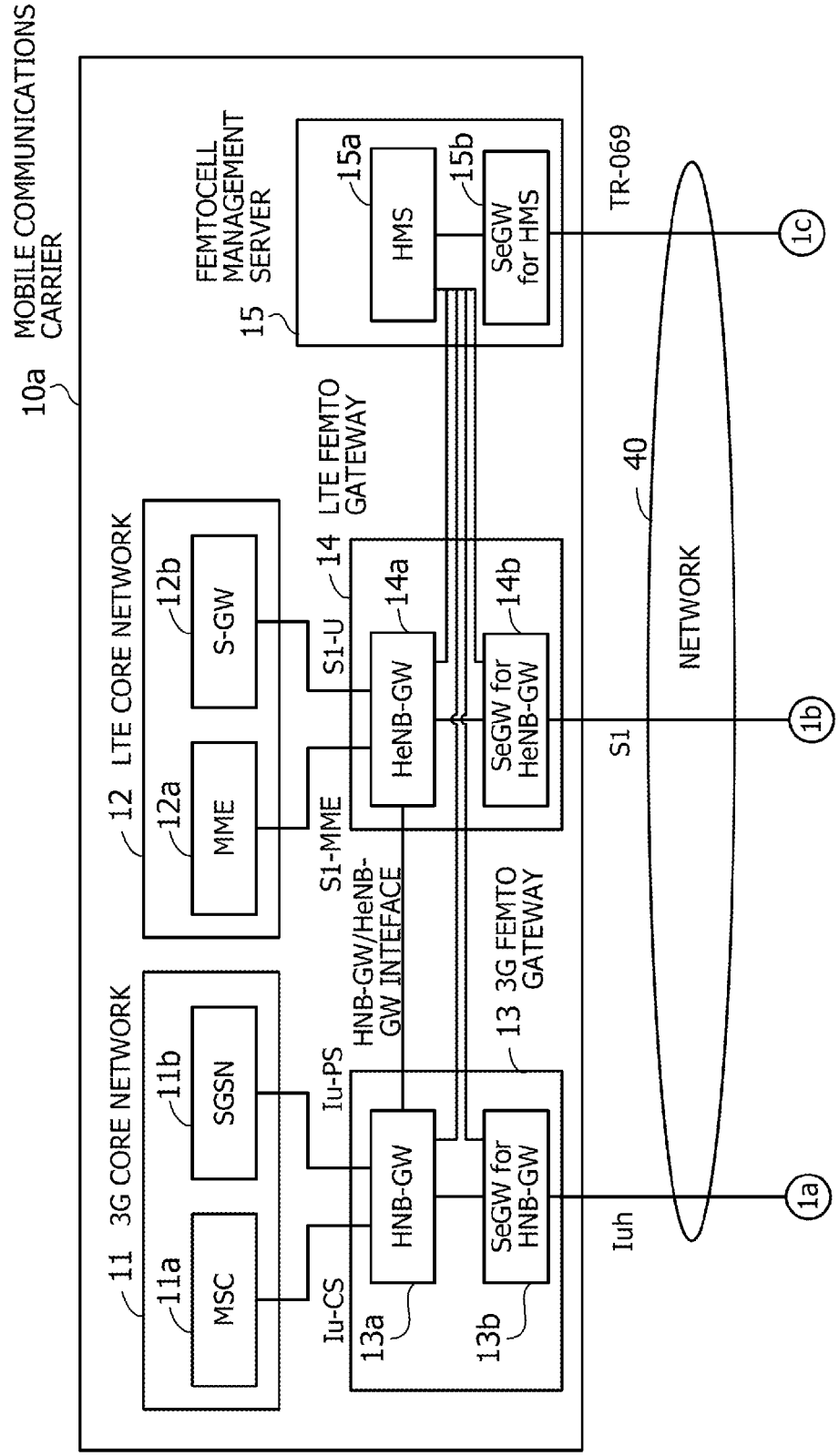
FIGS. 2 and 3 illustrate an example of overall structure of a radio communications system.
Figure 3:
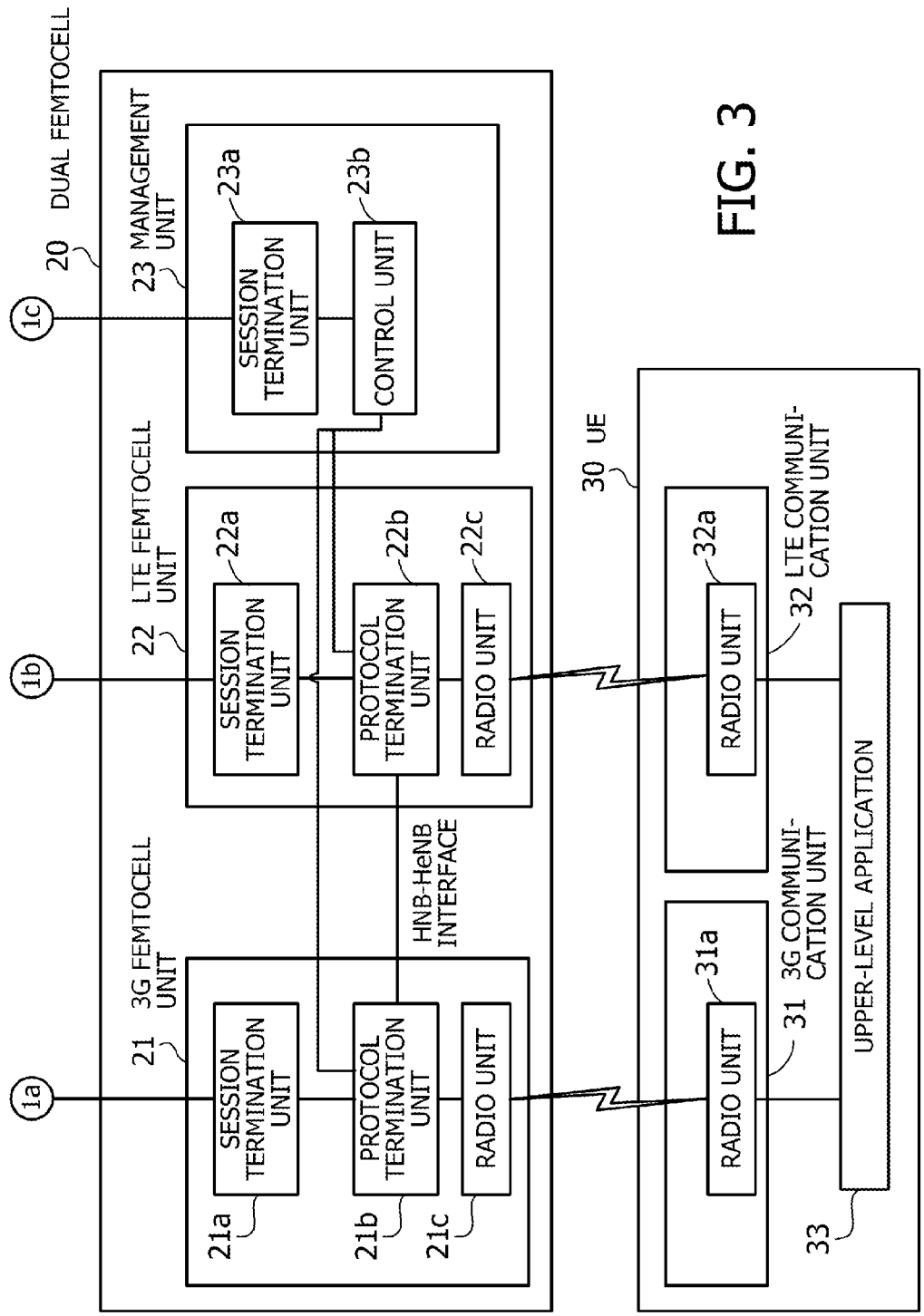

FIGS. 2 and 3 illustrate an example of overall structure of a radio communications system. The illustrated radio communications system 1a includes a mobile communications carrier 10a, a dual femtocell 20, and a piece of user equipment (UE) 30 such as a mobile phone. It is noted that the mobile communications carrier 10a provides functions of the foregoing upper-level carrier 10. It is also noted that the dual femtocell 20 is similar to the foregoing base station apparatus 20.

The mobile communications carrier 10a is connected to the dual femtocell 20 via a network 40. The network 40 may be, for example, a broadband network such as the Internet and an intranet. The network 40 may also include a public telephone network. The dual femtocell 20 and UE 30 are connected wirelessly via radio communication links.

The illustrated UE 30 is a radio communication device that is compatible with both the 3G and LTE systems. While not seen in FIGS. 2 and 3, the dual femtocell 20 may also serve other UE devices dedicated to either 3G communication or LTE communication.

To provide the UE 30 with communication services, the mobile communications carrier 10a is formed from the following networks and devices: a 3G core network 11, an LTE core network 12, a 3G femtocell gateway (GW) 13, an LTE femto gateway 14, and a femtocell management server 15. More specifically, the mobile communications carrier 10a includes the following components:

(a1) 3G Core Network 11

The 3G core network 11 is a core network that acts as an endpoint of 3G communication (i.e., terminates 3G communication interface). The illustrated 3G core network 11 includes a mobile switching center (MSC) 11a and a Serving GPPRS Support Node (SGSN) 11b, where GPRS stands for General Packet Radio Service. The MSC 11a is a core node device that acts as an endpoint or a switch of 3G voice communication. Control signals of the MSC 11a are referred to as Iu-CS C-Plane, while U-Plane signals of voice communication are referred to as Iu-CS U-Plane. The SGSN 11b is a core node device that acts as an endpoint of 3G packet communication. In packet communication of the SGSN 11b, control signals are referred to as Iu-CS U-Plane, and U-Plane signals are referred to as Iu-PS U-Plane.

(a2) LTE Core Network 12

The LTE core network 12 is a core network that acts as an endpoint of LTE communication (i.e., terminates LTE communication interface). The LTE core network 12 includes a Mobile Management Entity (MME) 12a and a Serving Gateway (S-GW) 12b. The MME 12a is a core node device that acts as an endpoint of control signals used in the LTE packet communication. Those control signals are referred to as S1-MME. The S-GW 12b is a core node device that acts as an endpoint of U-Plane signals in the LTE packet communication. Those U-Plane signals are referred to as S1-U.

(a3) 3G Femto Gateway 13

The 3G femto gateway 13 is a set of gateway facilities that acts as endpoint of communication protocols used by Home Node B (HNB). Here the term "HNB" refers to a femtocell based on the 3G technology. The 3G femto gateway 13 includes an HNB-GW 13a and a security gateway (SeGW) 13b for HNB-GW. The HNB-GW 13a is a gateway that acts as an endpoint of communication with a 3G femtocell unit 21 (described later) and forwards its signals to the MSC 11a and SGSN 11b at an upper level. The interface between the HNB-GW 13a and 3G femtocell unit 21 is named Iuh. More specifically, control signals for voice communication are referred to as Iuh-CS C-Plane. U-Plane signals for voice communication are referred to as Iuh-CS U-Plane. Control signals for packet communication are referred to as Iuh-PS C-Plane. U-Plane signals for packet communication are referred to as Iuh-PS U-Plane.

The HNB-GW 13a also acts as an endpoint of the HNB Application Part (HNBAP) protocol to communicate with a protocol termination unit 21b in the 3G femtocell unit 21 for the purpose of setting up the 3G femtocell unit 21 and registration of UE 30. The HNB-GW 13a further acts as an endpoint of interface with an HeNB-GW 14a in the LTE femto gateway 14. With this interface, the HNB-GW 13a receives a session connection request and a session disconnection request from an HNB Management System (HMS) 15a in the femtocell management server 15 and changes the state of sessions accordingly.

(a4) SeGW 13b for HNB-GW

The SeGW 13b for HNB-GW communicates with a 3G femtocell unit 21 (described later) in the dual femtocell 20 via the network 40. To this end, the SeGW 13b for HNB-GW establishes an IPsec session with a session termination unit 21a in the 3G femtocell unit 21.

(a5) LTE Femto Gateway 14

The LTE femto gateway 14 is a set of gateway facilities to terminate communication protocols of Home eNode B (HeNB), i.e., a femtocell based on the LTE technology. The LTE femto gateway 14 includes a HeNB-GW 14a and an SeGW 14b for HeNB.

The HeNB-GW 14a is a gateway that acts as an endpoint of communication with an LTE femtocell unit 22 (described later) and forwards signals to the MME 12a and S-GW 12b at an upper level. The interface between the HeNB-GW 14a and LTE femtocell unit 22 is called S1. Control signals for packet communication are referred to as S1-MME. U-Plane signals for packet communication are referred to as S1-U. The HeNB-GW 14a also acts as an endpoint of the interface to HNB-GW 13a in the 3G femto gateway 13. Further the HeNB-GW 14a changes the state of sessions when a session connection request or a session disconnection request is received from the HMS 15a in the femtocell management server 15.

The SeGW 14b for HeNB-GW is a security gateway for the HeNB-GW 14a to communicate with the LTE femtocell unit 22 in the dual femtocell 20 via the network 40. Specifically, the SeGW 14b for HeNB-GW establishes an IPsec session to a session termination unit 22a in the LTE femtocell unit 22.

(a6) Femtocell Management Server 15

The femtocell management server 15 is a maintenance and management node that is deployed to manage a plurality of dual femtocells including the illustrated dual femtocell 20. The femtocell management server 15 includes an HMS 15a and an SeGW 15b for HMS.

The HMS 15a communicates with a management unit 23 (described later) in the dual femtocell 20 by using control protocols such as TR-069 to control, for example, 3G communication paths and LTE communication paths. The functions of HMS are specified in relevant standard specifications, and this description thus omits their details. TR-069 is a technical specification of Broadband Forum, entitled "CPE WAN Management Protocol." CPE stands for "customer premises equipment," and WAN means "wide area network."

The SeGW 15b for HMS is a security gateway for the HMS 15a to communicate with the management unit 23 via the network 40. Specifically, the SeGW 15b for HMS establishes an IPsec session to a session termination unit 23a in the management unit 23.

Referring now to FIG. 3, the components of the dual femtocell 20 will be described below. The dual femtocell 20 is a subminiature base station designed for use in home, office, and commercial environments to enable simultaneous communication of up to about four users. The dual femtocell 20 supports both the 3G and LTE technologies. The dual femtocell 20 includes a 3G femtocell unit 21, an LTE femtocell unit 22, and a management unit 23, which serve as the foregoing first communication unit 21, second communication unit 22, and communication control unit 23, respectively.

(b1) 3G Femtocell Unit 21

The 3G femtocell unit 21 is a collection of functions necessary for providing 3G-based communication services. Specifically, the 3G femtocell unit 21 includes a session termination unit 21a, a protocol termination unit 21b, and a radio unit 21c, as will be detailed below.

The session termination unit 21a is a security gateway coupled to the network 40 for communication with the HNB-GW 13a in the 3G femto gateway 13 at an upper level. The session termination unit 21a establishes an IPsec session to the SeGW 13b for HNB-GW in the 3G femto gateway 13. The session termination unit 21a also changes the state of sessions when a session connection request or a session disconnection request is received from the control unit 23b in the management unit 23.

The protocol termination unit 21b is a functional block that terminates protocols of Iuh interface. Specifically, the protocol termination unit 21b terminates Iuh-CS C-Plane, Iuh-CS U-Plane, Iuh-PS C-Plane, Iuh-PS U-Plane, and Iuh HNBAP. The protocol termination unit 21b also terminates an HNB-HeNB interface to a protocol termination unit 22b (describe later) in the LTE femtocell unit 22.

The protocol termination unit 21b further changes the state of sessions when a session connection request or a session disconnection request is received from the control unit 23b in the management unit 23. Furthermore, the protocol termination unit 21b sends a setup completion notice, UE call connection start notice, and all-UE idling notice to the control unit 23b, according to the progress of communication of the UE 30.

The radio unit 21c is a functional block that performs wireless communication by using the 3G technology to communicate with the UE 30, which supports both 3G and LTE, as well as with ordinary 3G UEs (not illustrated). This wireless interface is referred to as Uu in the 3rd Generation Partnership Project (3GPP) standard, the details of which are omitted here.

(b2) LTE Femtocell Unit 22

The LTE femtocell unit 22 is a collection of functions necessary for providing LTE-based communication services. Specifically, the LTE femtocell unit 22 includes a session termination unit 22a, a protocol termination unit 22b, and a radio unit 22c, as will be detailed below.

The session termination unit 22a is a security gateway coupled to the network 40 for communication with the HeNB-GW 14a in the LTE femto gateway 14 at an upper level. Specifically, the session termination unit 22a establishes an IPsec session to the SeGW 14b for HeNB-GW in the LTE femto gateway 14. The session termination unit 22a also changes the state of sessions when a session connection request or a session disconnection request is received from the control unit 23b in the management unit 23.

The protocol termination unit 22b is a functional block that terminates protocols of S1 interface. Specifically, the protocol termination unit 22b terminates S1-MME and S1-U. The protocol termination unit 22b also terminates HNB-HeNB interface to the protocol termination unit 21b in the 3G femtocell unit 21. The protocol termination unit 22b further changes the state of sessions when a session connection request or a session disconnection request is received from the control unit 23b in the management unit 23. Furthermore, the protocol termination unit 22b sends a setup completion notice, UE call connection start notice, and all-UE idling notice to the control unit 23b according to the progress of communication of the UE 30.

The radio unit 22c is a functional block that performs wireless communication by using the LTE technology to communicate with the UE 30, which supports both 3G and LTE, as well as with ordinary LTE UEs (not illustrated). This wireless interface is referred to as LTE-Uu in the 3GPP standard (details are omitted here).

(b3) Management Unit 23

The management unit 23 is responsive to, for example, a setup completion notice, UE call connection start notice, and all-UE idling notice from the 3G femtocell unit 21 and LTE femtocell unit 22. Upon receipt of such a notice, the management unit 23 communicates with the femtocell management server 15 at the upper level by using TR-069 protocols and the like to send commands for session connection or disconnection. The management unit 23 includes a session termination unit 23a and a control unit 23b.

The session termination unit 23a is a security gateway coupled to the network 40 for communication with the HMS 15a in the femtocell management server 15 at the upper level. Specifically, the session termination unit 23a establishes an IPsec session to the SeGW 15b for HMS in the femtocell management server 15.

The control unit 23b produces commands for connecting or disconnecting sessions in response to notification of events from the protocol termination unit 21b in the 3G femtocell unit 21, as well as from the protocol termination unit 22b in the LTE femtocell unit 22. The notification may be, for example, a setup completion notice, a UE call connection start notice, and an all-UE idling notice.

Referring to the lower half of FIG. 3, the UE 30 is formed from the components described below. The UE 30 is an example implementation of user equipment that enables a subscriber to access network services through a dual femtocell 20. In addition to this UE 30, other UE devices dedicated to either 3G or LTE may also be used for communication of voice and other data traffic over the network 40. The illustrated UE 30 includes a 3G communication unit 31, an LTE communication unit 32, and an upper-level application 33, each of which is described below.

(c1) 3G Communication Unit 31

The 3G communication unit 31 is a functional block that performs communication by using the 3G technology. The 3G communication unit 31 includes a radio unit 31a which terminates 3G radio interface Uu (details are omitted here).

(c2) LTE Communication Unit 32

The LTE communication unit 32 is a functional block that performs communication by using the LTE technology. The LTE communication unit 32 includes a radio unit 32a which terminates LTE radio interface LTE-Uu (details are omitted here).

(c3) Upper-level Application 33

The upper-level application 33 is a function block that performs processing above the wireless layer (details are omitted here).

Figure 4:
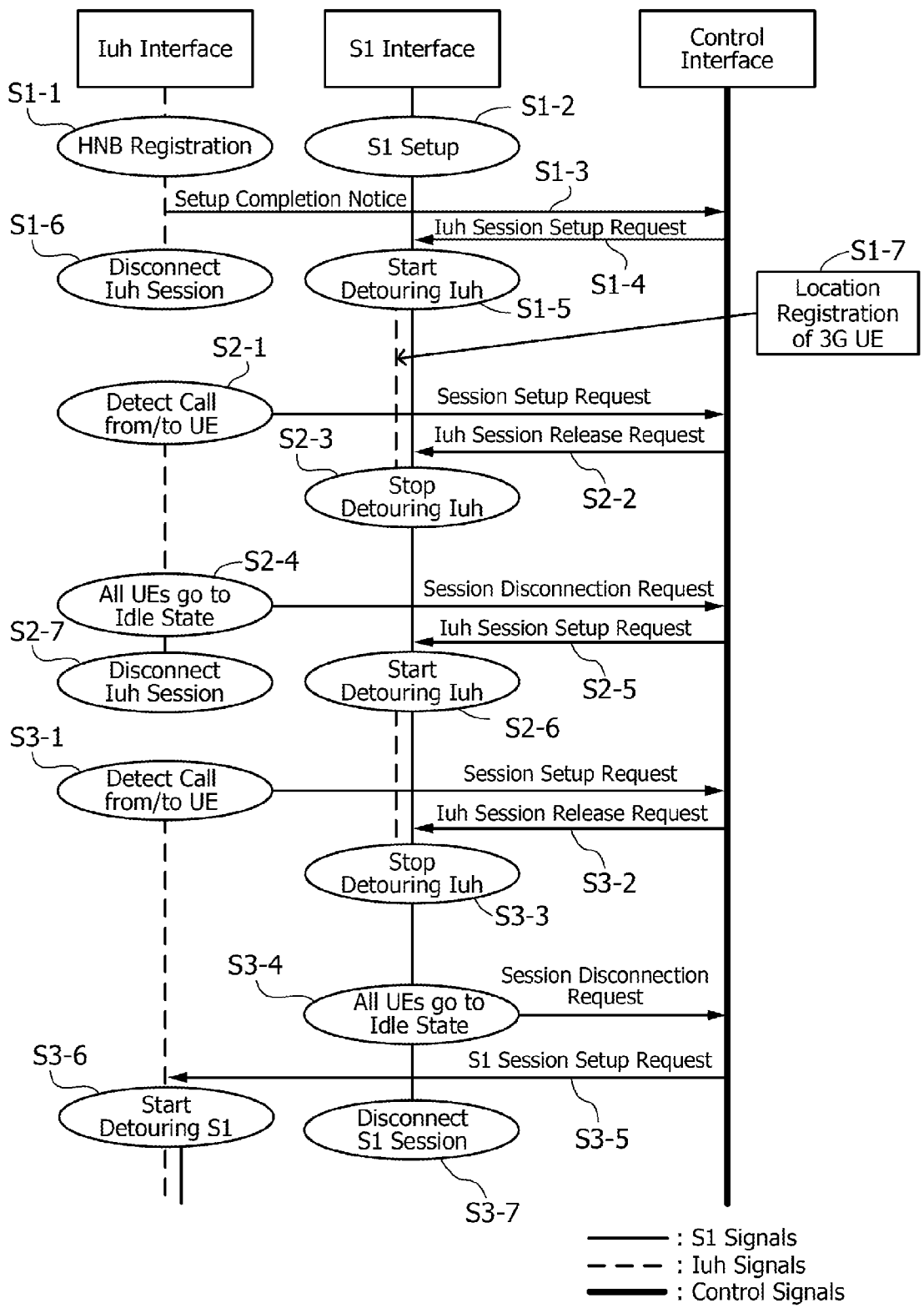
FIG. 4 is a sequence diagram illustrating operation of the entire system.

Referring now to FIG. 4 and subsequent drawings, the following section will provide more details about operation of the radio communications system 1a. The radio communications system 1a has both 3G and LTE communication interfaces as discussed above. Particularly, the radio communications system 1a uses either a 3G session (Iuh) or an LTE session (S1) as a secondary session for backup purposes. The secondary session is disconnected after the femtocell is started up for the first time. Control signals of the disconnected interface are transported via a detour, i.e., by using the remaining, non-disconnected communication interface. The control signals include, for example, heartbeat signals in the Stream Control Transmission Protocol (SCTP) layer. Under this situation, some local UE may reactivate itself from an idle state to initiate an outgoing call or receive an incoming call. When this UE needs the currently disconnected session to achieve the call, the dual femtocell reestablishes that session and stops using the detour. Other UEs may also make a call in a similar way. When all such calls are finished, the dual femtocell sees that all its local UEs are in the idle state again. Then the dual femtocell disconnects the revived session.

FIG. 4 is a sequence diagram that gives an overview of operation of the entire system, assuming that S1 and Iuh sessions respectively serve as primary and secondary sessions when the communication is started. FIG. 4 omits some details of control signals. The following description of FIG. 4 also assumes that the decision of whether to initiate connection or disconnection of a session is up to each functional block in the dual femtocell 20. While the HNB-GW may be configured to make such decisions, the description does not discuss this alternative configuration since the operation of the system as a whole is not particularly different.

(S1-1) HNB Registration procedure is executed over the Iuh interface. The Iuh interface is a logical interface that offers Iuh sessions for conveying data in the Iuh protocols.

(S1-2) S1 Setup procedure is executed over the S1 interface. The S1 interface is a logical interface that offers S1 sessions for conveying data in the S1 protocols.

(S1-3) A setup completion notice is sent from the Iuh interface to the control interface.

(S1-4) An Iuh session setup request is sent from the control interface to the S1 interface.

(S1-5) The S1 interface starts detouring Iuh signals.

(S1-6) Iuh session is disconnected.

(S1-7) Location registration of UEs in a 3G femtocell is executed by using the bypass interface.

(S2-1) An outgoing call from or an incoming call to a UE 30 is detected on the Iuh interface, which causes transmission of a session setup request to the control interface.

(S2-2) An Iuh session release request is sent from the control interface to the S1 interface.

(S2-3) The S1 interface stops detouring Iuh signals.

(S2-4) All UEs under the control of the Iuh interface go into an idle state. Accordingly, a session disconnection request is sent to the control interface.

(S2-5) An Iuh session setup request is sent from the control interface to the S1 interface.

(S2-6) The S1 interface starts detouring Iuh signals.

(S2-7) Iuh session is disconnected.

(S3-1) An outgoing call from or an incoming call to a UE 30 is detected on the Iuh interface, which causes transmission of a session setup request to the control interface.

(S3-2) An Iuh session release request is sent from the control interface to the S1 interface.

(S3-3) The S1 interface stops detouring Iuh signals.

(S3-4) All UEs under the control of the S1 interface go to an idle state. That is, all UEs in the S1 femtocell become idle during the period when the UE 30 in the 3G femtocell is active in communication. This event causes the S1 interface to send a session disconnection request to the control interface.

(S3-5) An S1 session setup request is sent from the control interface to the Iuh interface.

(S3-6) The Iuh interface starts detouring S1 signals.

(S3-7) S1 session is disconnected.

More specifically, the radio communications system 1a reconfigures itself as follows. In one configuration, the radio communications system 1a sends Iuh signals by using S1 as a detour, while disconnecting Iuh. In another configuration, the radio communications system 1a sends S1 signals by using Iuh as a detour, while disconnecting S1.

The former configuration, i.e., sending Iuh signals by using S1 to detour around disconnected Iuh, is achieved mainly by the following five actions: (1) Iuh session disconnection after setup of femtocell, (2) communication during the absence of Iuh sessions, (3) call reception during the absence of Iuh sessions, (4) call initiation during the absence of Iuh session, and (5) Iuh session disconnection upon transition of all Iuh UEs to idle state.

The latter configuration, i.e., sending S1 signals by using Iuh to detour around disconnected S1, is achieved mainly by for following five actions: (6) S1 session disconnection after setup of femtocell, (7) communication during the absence of S1 sessions, (8) call reception during the absence of S1 sessions, (9) call initiation during the absence of S1 sessions, and (10) S1 session disconnection upon transition of all S1 UEs to idle state. Each of the above actions (1) to (10) will be discussed below.

(1) Iuh Session Disconnection after Setup of Femtocell

Figure 5:
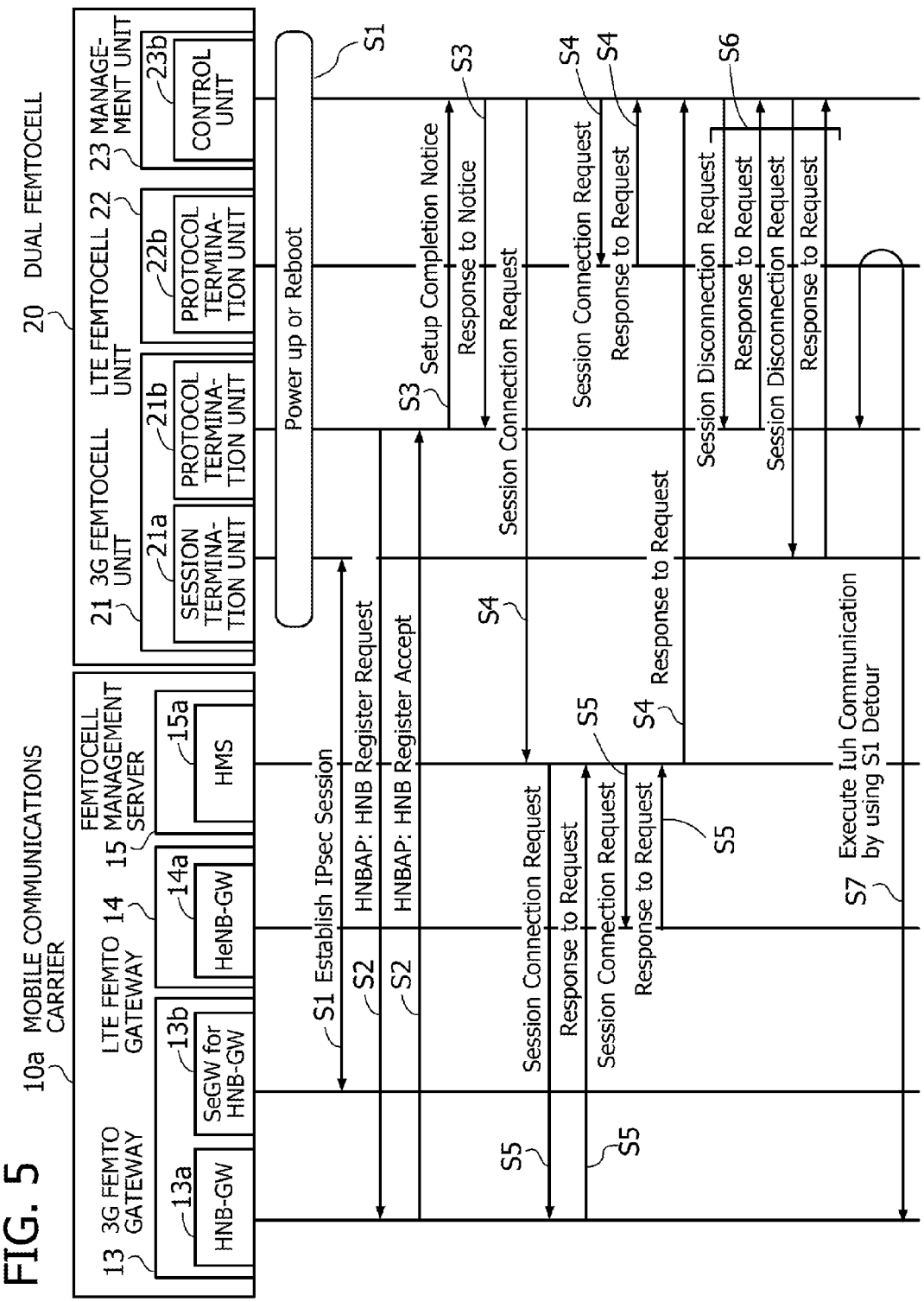
FIG. 5 is a sequence diagram illustrating disconnection of an Iuh session after a femtocell is set up.

FIG. 5 is a sequence diagram illustrating disconnection of an Iuh session after a femtocell is set up.

(S1) The session termination unit 21a in the 3G femtocell unit 21 establishes an IPsec session to the SeGW 13b for HNB-GW in the 3G femto gateway 13 immediately after the dual femtocell 20 is powered up or rebooted.

(S2) The protocol termination unit 21b establishes a connection with the HNB-GW 13a. According to the 3GPP standards, an HNB registration procedure is executed in the HNBAP protocol after their association in SCTP layer has become operational.

(S3) The protocol termination unit 21b sends a setup completion notice to the control unit 23b.

(S4) Upon receipt of the above message, the control unit 23b sends a session connection request to the HMS 15a in the femtocell management server 15. The control unit 23b also sends a session connection request to the protocol termination unit 22b in the LTE femtocell unit 22.

(S5) Upon receipt of the above message, the HMS 15a sends a session connection request to both HNB-GW 13a and HeNB-GW 14a.

(S6) The control unit 23b sends a session disconnection request to the protocol termination unit 21b and session termination unit 21a.

(S7) Iuh communication is executed by using the S1 detour (i.e., using the S1 session as a detour), while the Iuh session is disconnected.

The above-described sequence disconnects an Iuh session after femtocell setup and thus reduces IPsec sessions between the SeGW 13b for HNB-GW and the session termination unit 21a. The reduction in consumption of communication sessions relieves the load of sessions on the SeGW 13b for HNB-GW and dual femtocell 20.

(2) Communication during the Absence of Iuh Sessions

The protocol termination unit 21b sends its peer protocol termination unit 22b an uplink packet addressed to the HNB-GW 13a. The protocol termination unit 22b encapsulates the received uplink packet into an S1 packet and transmits it to the HeNB-GW 14a. The HeNB-GW 14a decapsulates this packet and forwards the contained packet to the HNB-GW 13a. Similarly to the uplink packet described above, a downlink packet is sent from the HNB-GW 13a to the protocol termination unit 21b via the HeNB-GW 14a and protocol termination unit 22b.

The above-described communication during the absence of Iuh sessions makes it possible for the SeGW 13b for HNB-GW and the session termination unit 21a to communicate without using IPsec sessions. This feature relieves the load of sessions on the SeGW 13b for HNB-GW and dual femtocell 20.

(3) Call Reception During the Absence of Iuh Sessions

Figure 6:
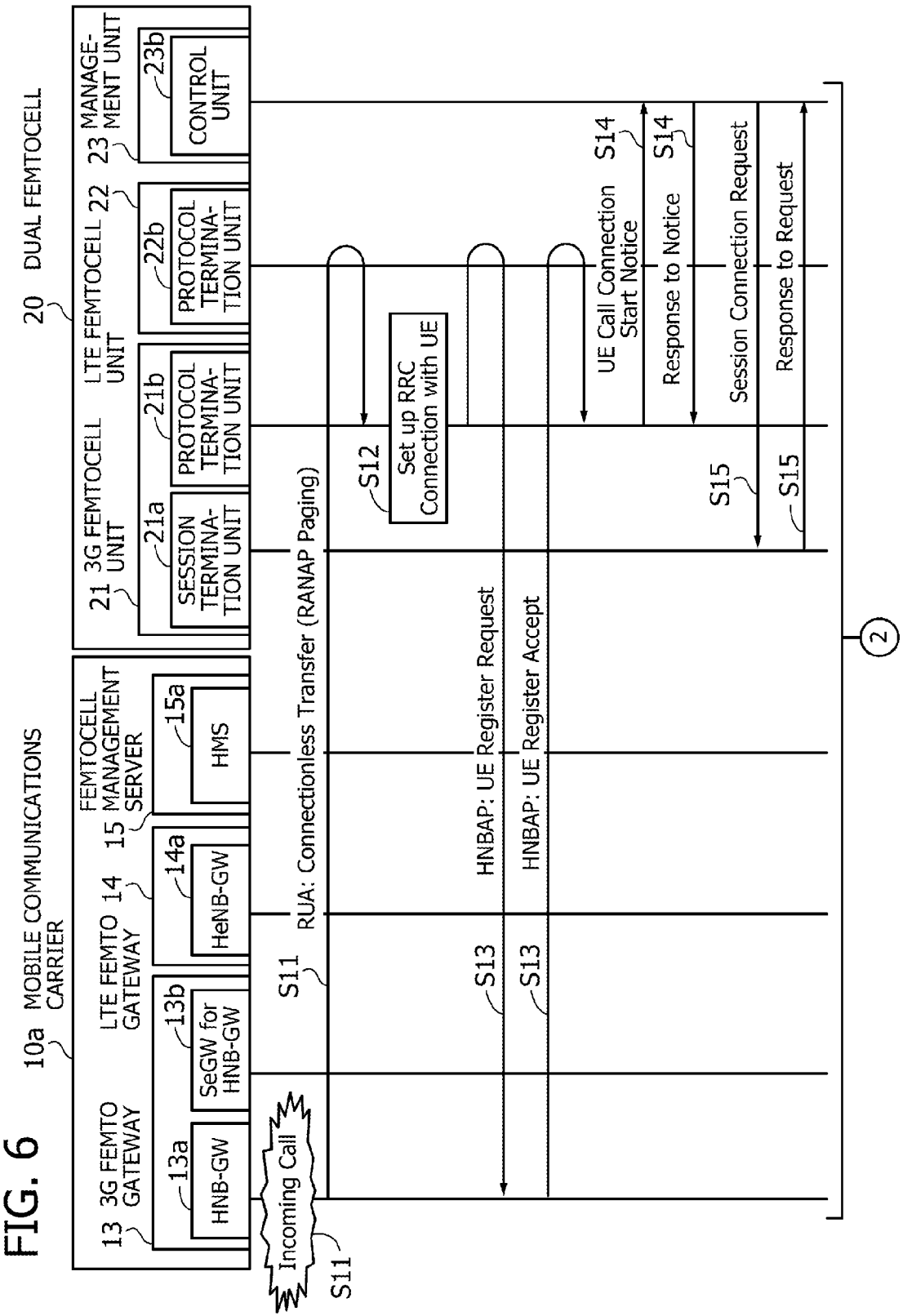
FIGS. 6 and 7 are a sequence diagram illustrating a call reception procedure while the Iuh session is disconnected.
Figure 7:
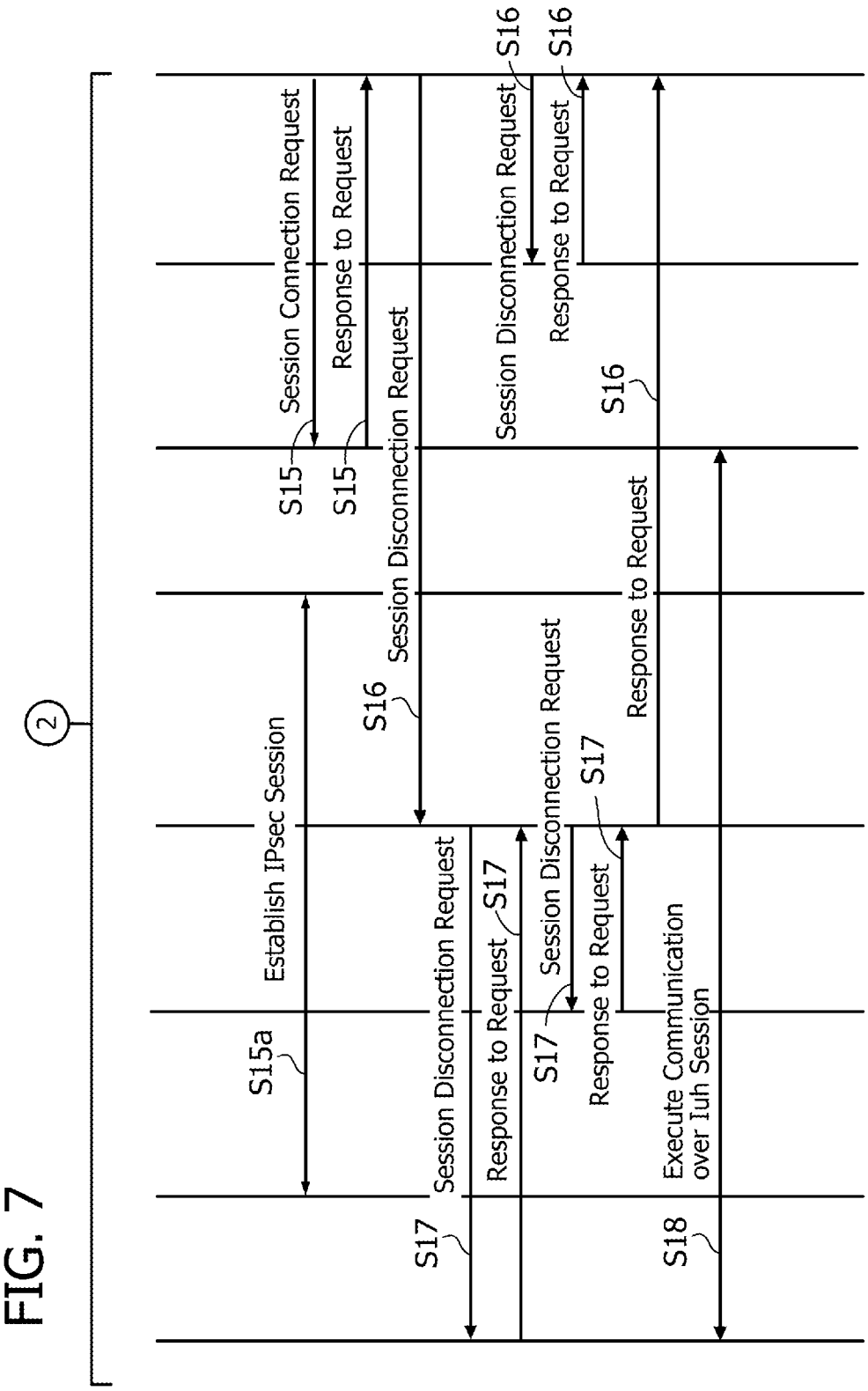

FIGS. 6 and 7 are a sequence diagram illustrating a call reception procedure while the Iuh session is disconnected.

(S11) An incoming call addressed to a UE under the control of the 3G femtocell unit 21 is received while the Iuh session is disconnected. In this case, the protocol termination unit 21b receives a paging signal from the HNB-GW 13a via a detour over the S1 session. According to the 3GPP standards, this paging signal is received as a Connectionless Transfer (RANAP Paging) in the RUA protocol.

(S12) Through its local radio unit 21c, the protocol termination unit 21b sets up a Radio Resource Control (RRC) connection with the 3G communication unit 31 in the UE 30.

(S13) The protocol termination unit 21b registers the UE with the HNB-GW 13a via the S1 detour. According to the 3GPP standards, this registration is executed as a UE Registration procedure in the HNBAP protocol.

(S14) The protocol termination unit 21b sends a UE call connection start notice to the control unit 23b.

(S15) Upon receipt of the above message, the control unit 23b sends a session connection request to the session termination unit 21a and protocol termination unit 21b.

(S15a) An IPsec session is established between the SeGW 13b for HNB-GW and the session termination unit 21a.

(S16) The control unit 23b sends a session disconnection request to the HMS 15a in the femtocell management server 15. The control unit 23b also sends a session disconnection request to the protocol termination unit 22b in the LTE femtocell unit 22.

(S17) Upon receipt of the above message, the HMS 15a sends a session disconnection request to the HNB-GW 13a and HeNB-GW 14a.

(S18) The Iuh session is connected for normal communication, while the S1 detour is disconnected.

The above-described sequence restores the normal communication path in response to an incoming call received during the absence of Iuh sessions. This feature makes it possible to distribute the load on the detour.

(4) Call Initiation During the Absence of Iuh Sessions

Figure 8:
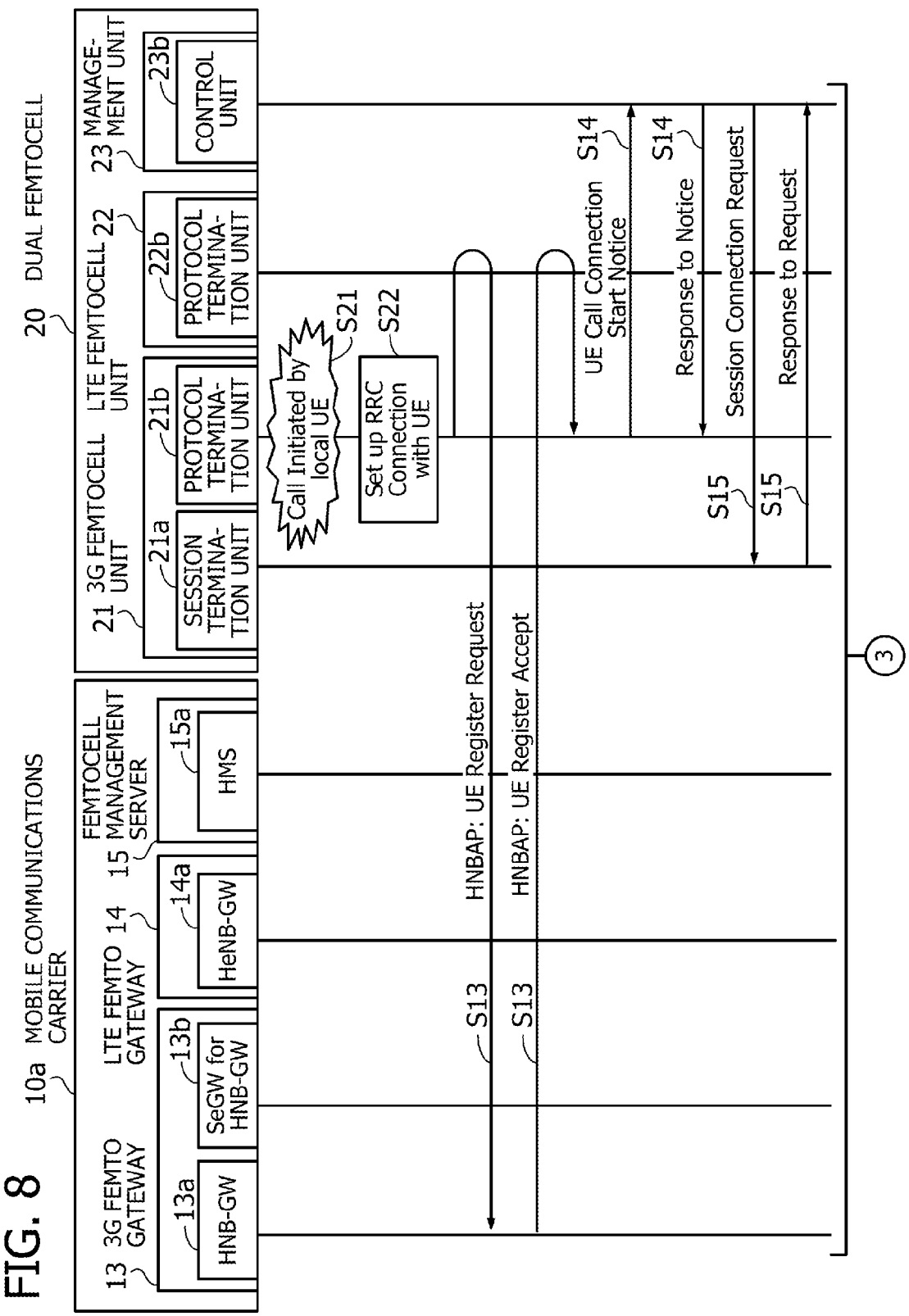
FIGS. 8 and 9 are a sequence diagram illustrating a call initiation procedure while the Iuh session is disconnected.
Figure 9:
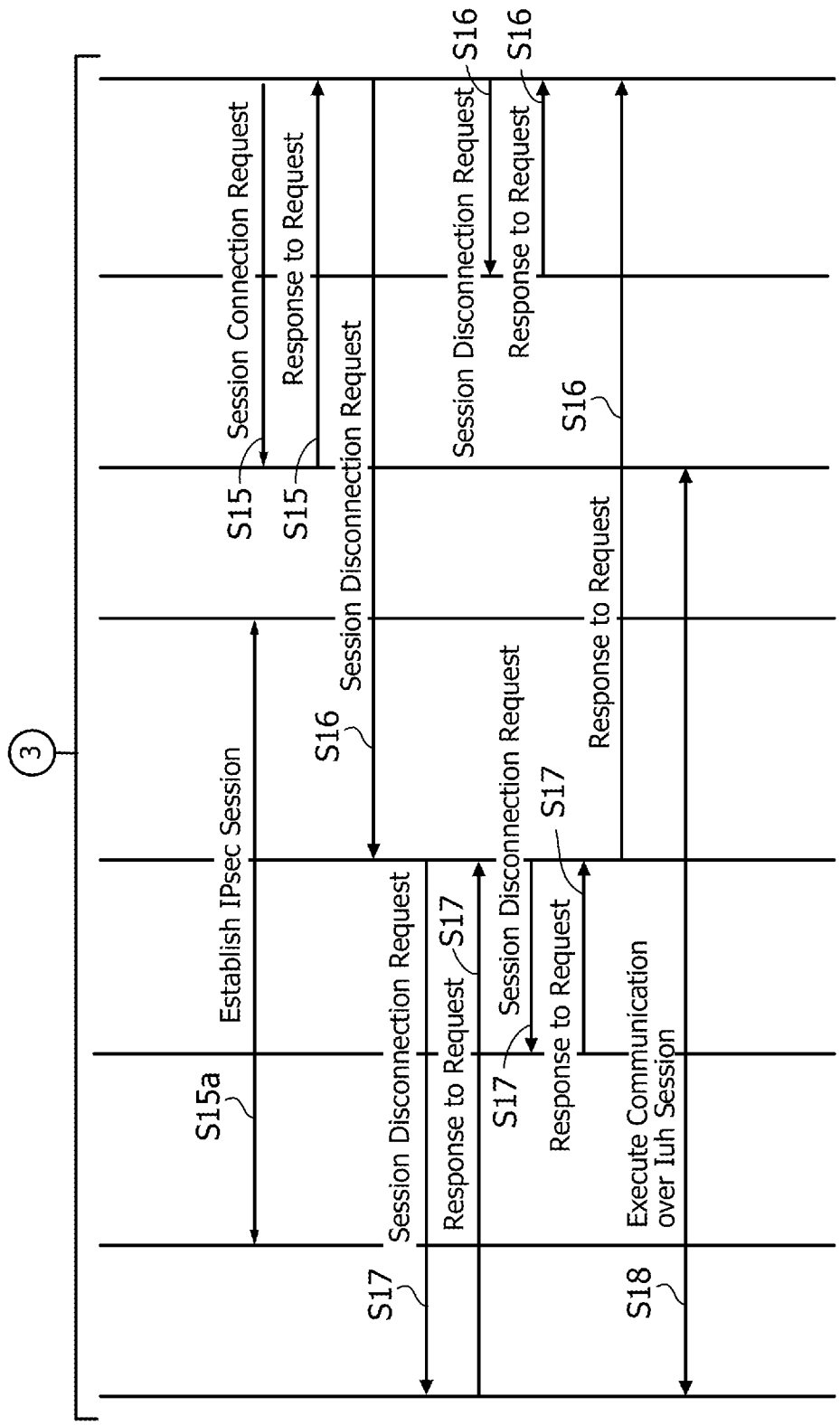

FIGS. 8 and 9 are a sequence diagram illustrating a call initiation procedure while the Iuh session is disconnected.

(S21) An outgoing call is initiated by a UE 30 under the control of the 3G femtocell unit 21 while the Iuh session is disconnected.

(S22) Through its local radio unit 21c, the protocol termination unit 21b sets up an RRC connection with the 3G communication unit 31 in the UE 30. The rest of the communication sequence is similar to steps S13 to S18 discussed above in FIGS. 6 and 7.

The above-described sequence restores the normal communication path in response to an outgoing call initiated during the absence of Iuh sessions. This feature makes it possible to distribute the load on the detour.

(5) Iuh Session Disconnection Upon Transition of all Iuh UEs to Idle State

Figure 10:
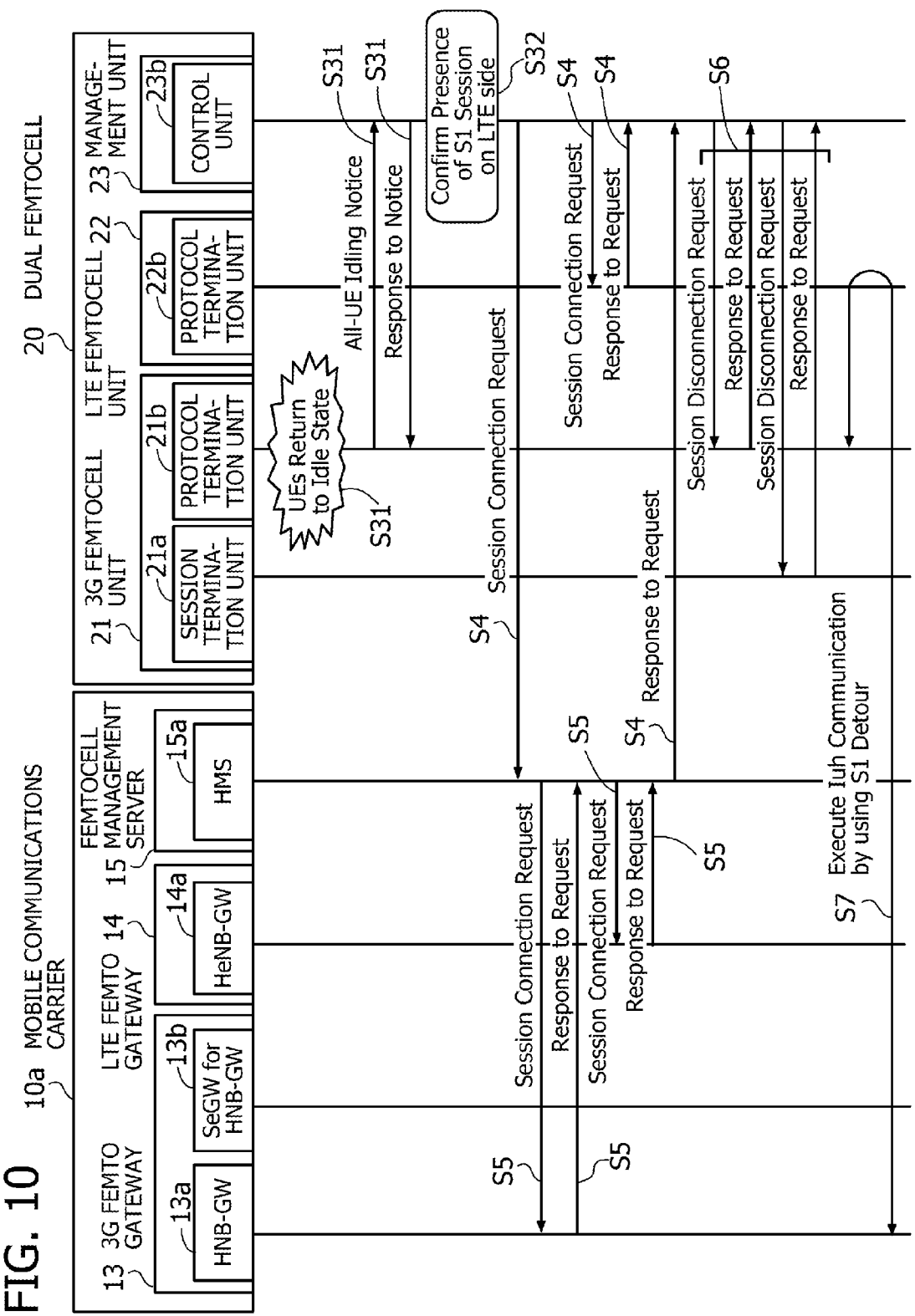
FIG. 10 is a sequence diagram illustrating disconnection of an Iuh session when all local UEs have returned to idle state.

FIG. 10 is a sequence diagram illustrating disconnection of an Iuh session when all local UEs have returned to the idle state.

(S31) Upon completion of the incoming call received in (3) or the outgoing call initiated in (4), the protocol termination unit 21b recognizes that all its local UEs have returned to the idle state. The protocol termination unit 21b then notifies the control unit 23b of this fact by sending an all-UE idling notice.

(S32) Upon receipt of the above message, the control unit 23b confirms the presence of S1 session on the LTE side. When it is confirmed that the S1 session is not disconnected, the communications system executes the same steps S4 to S7 discussed in FIG. 5.

The above-described sequence of Iuh disconnection disconnects an IPsec session between the SeGW 13b for HNB-GW and the session termination unit 21a in response to transition of all UEs to idle state. The reduction in consumption of communication sessions relieves the load of sessions on the SeGW 13b for HNB-GW and dual femtocell 20.

(6) S1 Session Disconnection after Setup of Femtocell

Figure 11:
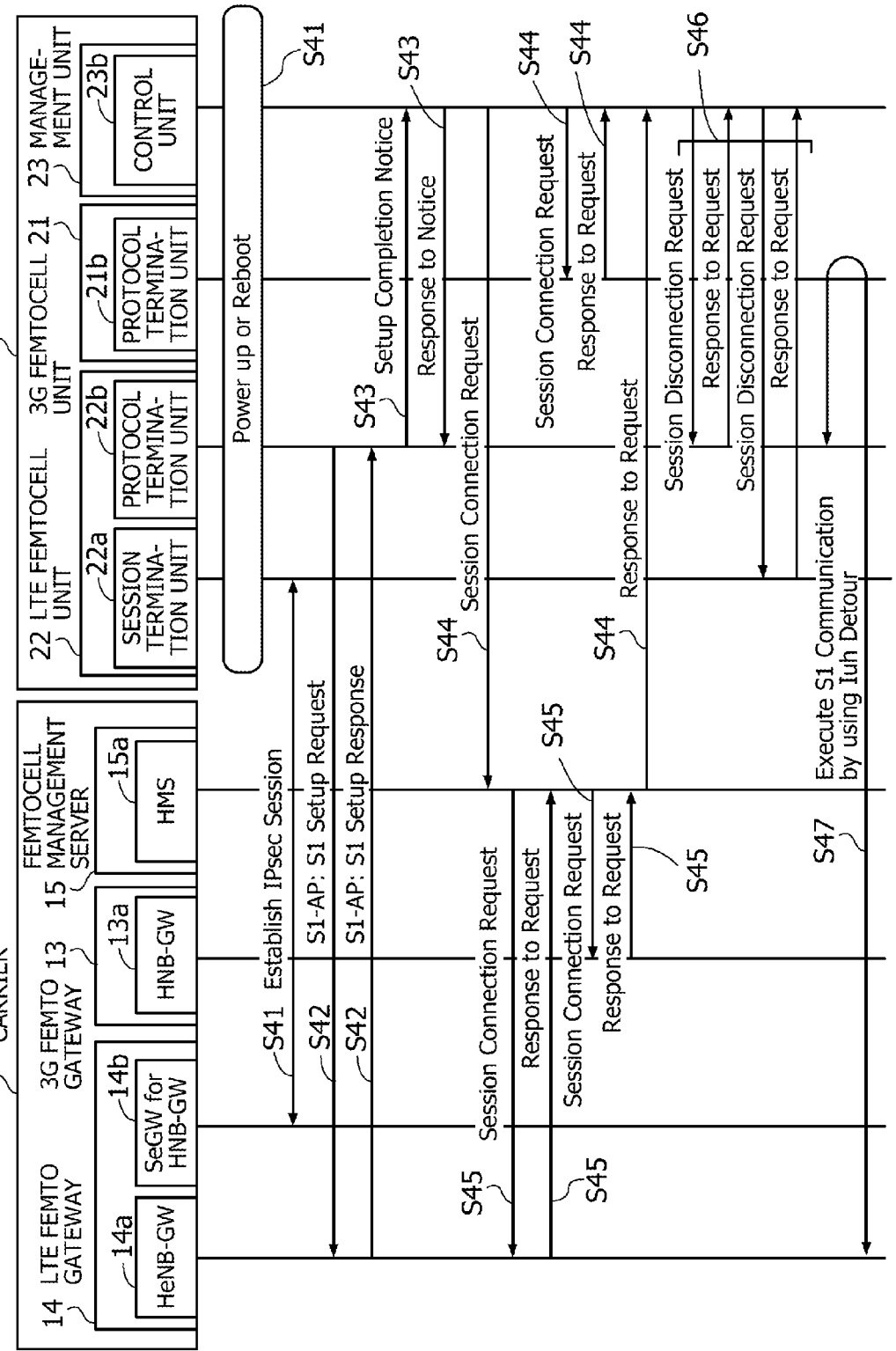
FIG. 11 is a sequence diagram illustrating disconnection of an S1 session after a femtocell is set up.

FIG. 11 is a sequence diagram illustrating disconnection of an S1 session after a femtocell is set up.

(S41) The session termination unit 22a in the LTE femtocell unit 22 establishes an IPsec session to the SeGW 14b for HeNB-GW in the LTE femto gateway 14 immediately after the dual femtocell 20 is powered up or rebooted.

(S42) The protocol termination unit 22b establishes a connection with the HeNB-GW 14a. According to the 3GPP standards, an S1 setup procedure is executed in the S1-Application Part (S1-AP) protocol after their association in SCTP layer has become operational.

(S43) The protocol termination unit 22b sends a setup completion notice to the control unit 23b.

(S44) Upon receipt of the above notice, the control unit 23b sends a session connection request to the HMS 15a in the femtocell management server 15. The control unit 23b also sends a session connection request to the protocol termination unit 21b in the 3G femtocell unit 21.

(S45) Upon receipt of the above request, the HMS 15a sends a session connection request to both the HNB-GW 13a and HeNB-GW 14a.

(S46) The control unit 23b sends a session disconnection request to the protocol termination unit 22b and session termination unit 22a.

(S47) S1 communication is executed by using the Iuh detour (i.e., using the Iuh session as a detour), while the S1 session is disconnected.

The above-described sequence disconnects the S1 session after femtocell setup and thus reduces IPsec sessions between the SeGW 14b for HeNB-GW and the session termination unit 22a. The reduction in consumption of communication sessions relieves the load of sessions on the SeGW 14b for HeNB-GW and dual femtocell 20.

(7) Communication During the Absence of S1 Sessions

The protocol termination unit 22b sends the protocol termination unit 21b an uplink packet addressed to the HeNB-GW 14a. Specifically, the protocol termination unit 21b encapsulates this packet into an Iuh packet and transmits it to the HNB-GW 13a. The receiving HNB-GW 13a decapsulates this packet and forwards the contained packet to the HeNB-GW 14a. Similarly to the uplink packet described above, a downlink packet is sent from the HeNB-GW 14a to the protocol termination unit 22b via the HNB-GW 13a and protocol termination unit 21b.

The above-described communication during the absence of S1 sessions makes it possible for the SeGW 14b for HeNB-GW and the session termination unit 22a to communicate without using IPsec sessions. This feature relieves the load of sessions on the SeGW 14b for HeNB-GW and dual femtocell 20.

(8) Call Reception During the Absence of S1 Sessions

Figure 12:
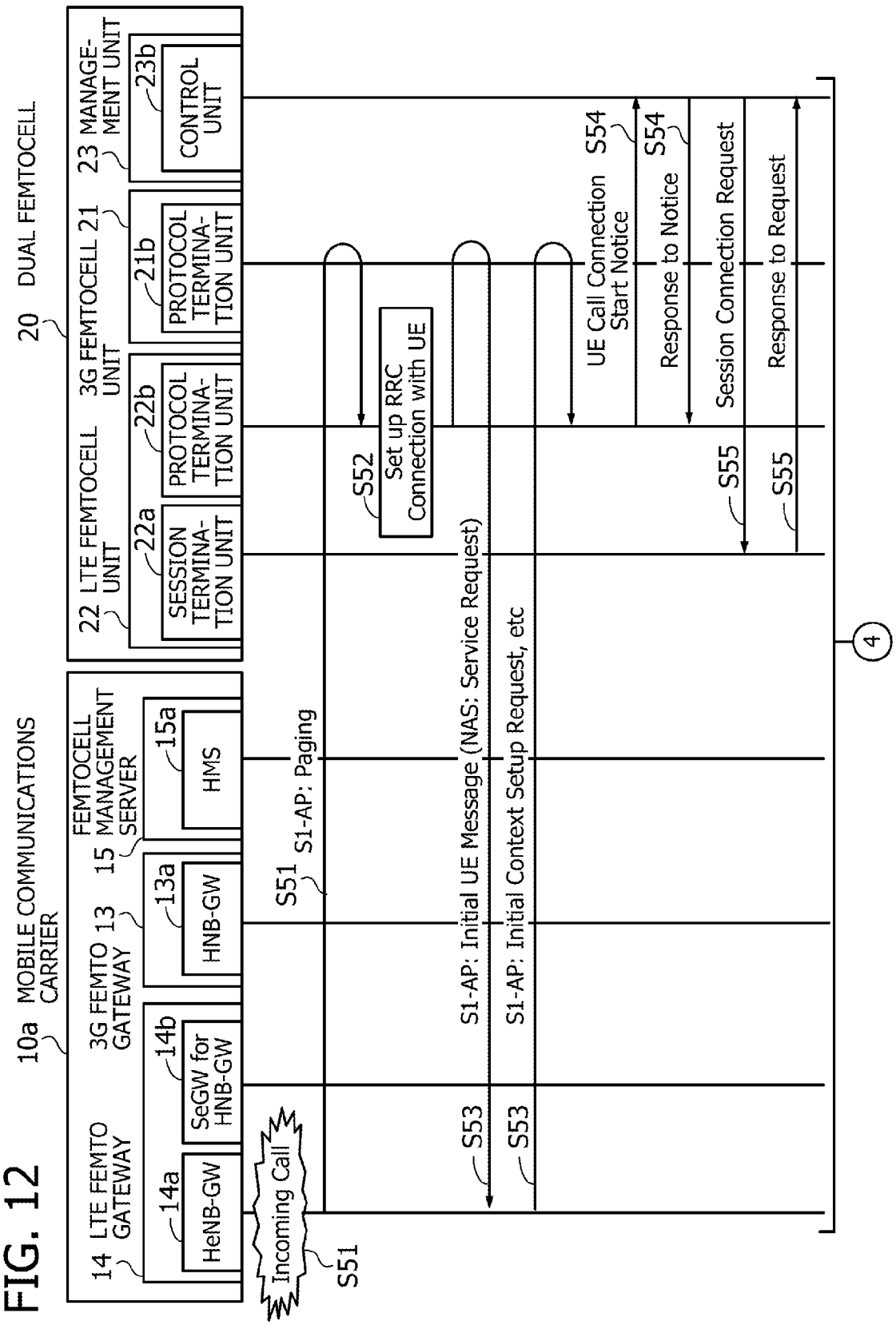
FIGS. 12 and 13 are a sequence diagram illustrating a call reception procedure while the S1 session is disconnected.
Figure 13:
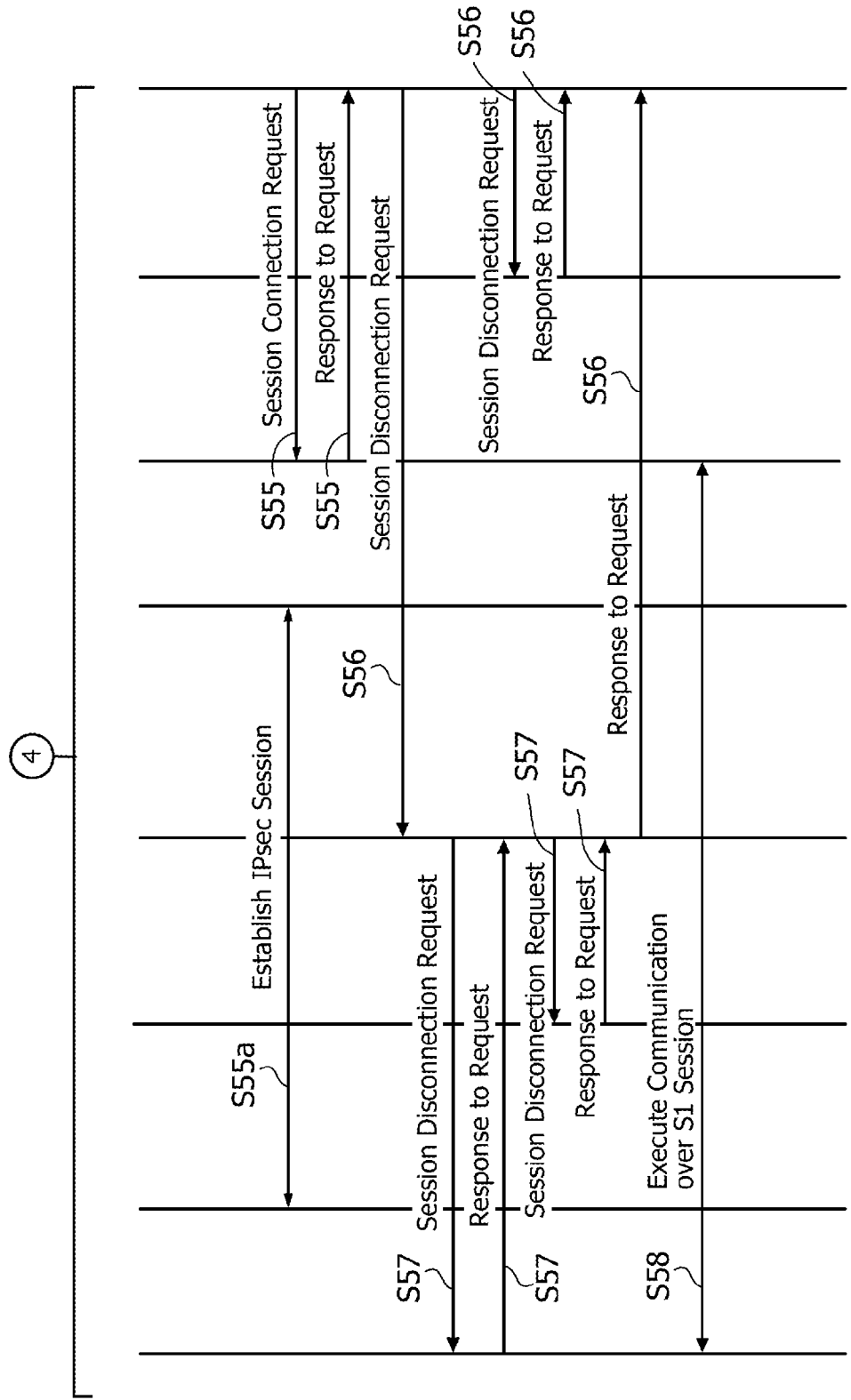

FIGS. 12 and 13 are a sequence diagram illustrating a call reception procedure while the S1 session is disconnected.

(S51) An incoming call addressed to a UE under the control of the LTE femtocell unit 22 is received while the S1 session is disconnected. In this case, the protocol termination unit 22b receives a paging signal from the HeNB-GW 14a via a detour using the Iuh session. According to the 3GPP standards, this is executed as a Paging procedure in the S1-AP protocol.

(S52) Through its local radio unit 22c, the protocol termination unit 22b sets up an RRC connection with the LTE communication unit 32 in the UE 30.

(S53) The protocol termination unit 22b executes a call initiation process towards the HeNB-GW 14a via a detour using the Iuh session. According to the 3GPP standards, this is achieved by sending an initial UE message in the S1-AP protocol.

(S54) The protocol termination unit 22b sends a UE call connection start notice to the control unit 23b.

(S55) Upon receipt of the above notice, the control unit 23b sends a session connection request to the session termination unit 22a and protocol termination unit 22b.

(S55a) An IPsec session is established between the SeGW 14b for HeNB-GW and the session termination unit 22a.

(S56) The control unit 23b sends a session disconnection request to the HMS 15a in the femtocell management server 15. The control unit 23b also sends a session disconnection request to the protocol termination unit 21b in the 3G femtocell unit 21.

(S57) Upon receipt of the above message, the HMS 15a sends a session disconnection request to the HNB-GW 13a and HeNB-GW 14a.

(S58) The S1 session is connected for normal communication, while the Iuh detour is disconnected.

The above-described sequence restores the normal communication path in response to an incoming call received during the absence of S1 sessions. This feature makes it possible to distribute the load on the detour.

(9) Call Initiation During the Absence of S1 Sessions

Figure 14:
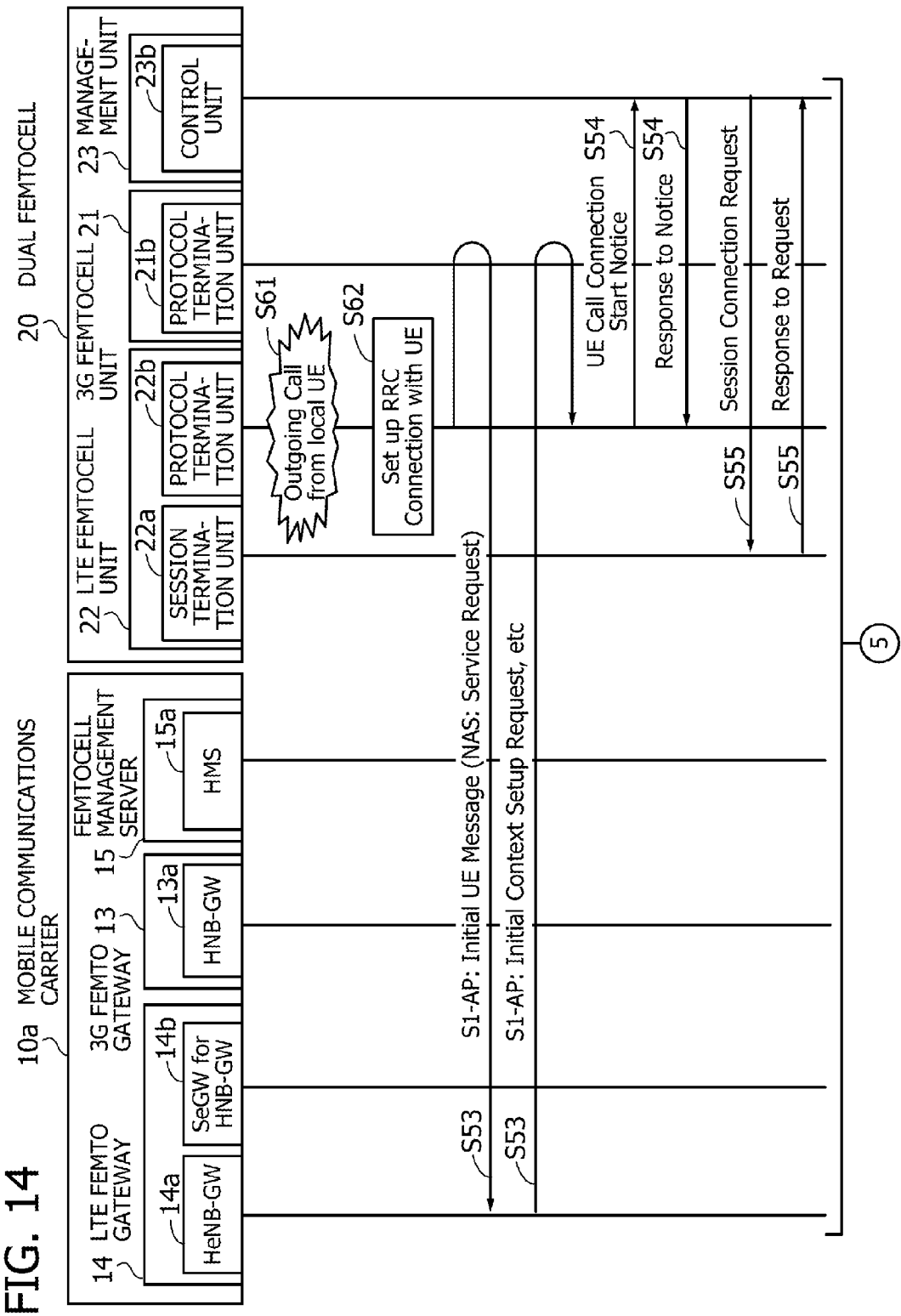
FIGS. 14 and 15 are a sequence diagram illustrating a call initiation procedure while the S1 session is disconnected.
Figure 15:
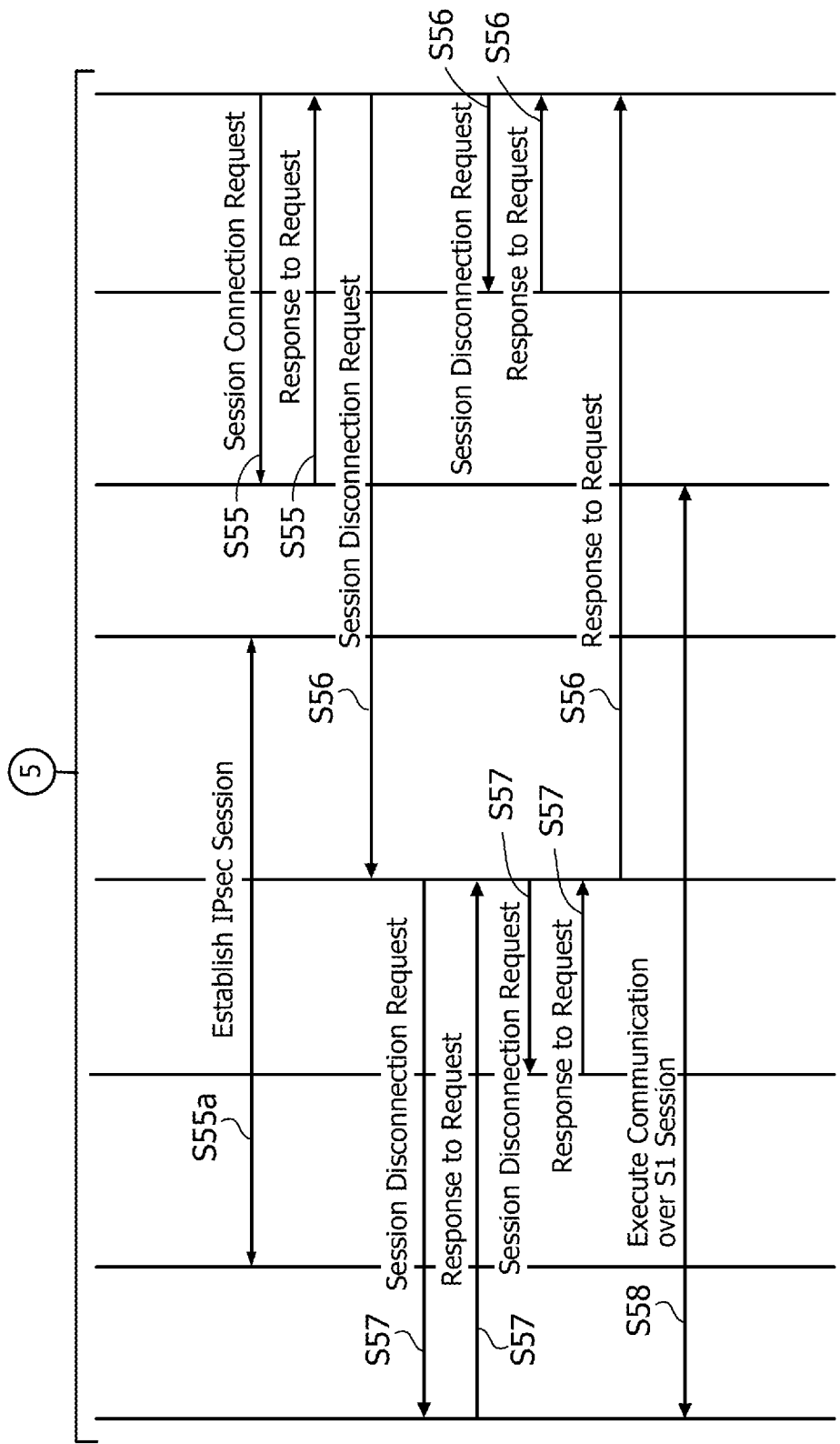

FIGS. 14 and 15 are a sequence diagram illustrating a call initiation procedure while the S1 session is disconnected.

(S61) An outgoing call is initiated by a UE 30 under the control of the LTE femtocell unit 22 while the S1 session is disconnected.

(S62) Through its local radio unit 22c, the protocol termination unit 22b sets up an RRC connection with the LTE communication unit 32 in the UE 30. The rest of the communication sequence is similar to steps S53 to S58 discussed above in FIGS. 12 and 13.

The above-described sequence restores the normal communication path in response to an outgoing call initiated during the absence of S1 sessions. This feature makes it possible to distribute the load on the detour.

(10) S1 Session Disconnection Upon Transition of all S1 UEs to Idle State

FIG. 16 is a sequence diagram illustrating disconnection of an S1 session when all subordinate UEs have returned to the idle state.

(S71) Upon completion of the incoming call received in (8) or the outgoing call initiated in (9) during absence of S1 sessions, the protocol termination unit 22b recognizes that all its local UEs have returned to the idle state. The protocol termination unit 22b then notifies the control unit 23b of this fact by sending an all-UE idling notice.

(S72) Upon receipt of the above message, the control unit 23b confirms the presence of Iuh session on the 3G side. When it is confirmed that the Iuh session is not disconnected, the communications system executes the same steps S44 to S47 discussed in FIG. 11.

The above-described sequence of S1 disconnection disconnects an IPsec session between the SeGW 14b for HeNB-GW and the session termination unit 22a in response to transition of all UEs to idle state. The reduction in consumption of communication sessions relieves the load of sessions on the SeGW 14b for HeNB-GW and dual femtocell 20.

The proposed radio communications system uses various messages. Those messages are composed in accordance with some specific message formats that define how to organize the content data. The following section will describe several examples of such message formats.

FIG. 17 illustrates a data format of a setup completion notice. The illustrated setup completion notice message m1 is formed from the following data fields: Message Name, Source Node Name, Femtocell-side Connection Data, and Femto GW-side Connection Data.

For example, the Message Name field contains a value of "Setup Completion Notice." The Source Node Name field contains a value of "3G Femtocell" or "LTE Femtocell." The Femtocell-side Connection Data field contains as much connection setup data as necessary for a femtocell, which may include: Internet Protocol (IP) address, port number, point code of Stream Control Transmission Protocol (SCTP), and Tunnel Endpoint Identifier (TEID) of General Packet Radio Service (GPRS) Tunneling Protocol-User plane (GTP-U). The femto GW-side Connection Data field contains as much connection setup data as necessary for a femto gateway, which may include: IP address, port number, point code of SCTP, and TEID of GTP-U.

Figure 18:
FIG. 18 illustrates a data format of a response to a setup completion notice.

FIG. 18 illustrates a data format of a response to a setup completion notice. The illustrated response message m1r of setup completion notice is formed from the following data fields: Message Name, Source Node Name, and Connection Result. For example, the Message Name field contains a value of "Response to Setup Completion Notice." The Source Node Name field contains a value of "Management Unit." The Connection Result field contains a value of either "Done" or "Failed."

FIG. 19 illustrates a data format of a session connection request. The illustrated session connection request message m2 is formed from the following data fields: Message Name, Disrupted Node Name, Femtocell-side Connection Data, and Femto GW-side Connection Data. For example, the Message Name field contains a value of "Session Connection Request." The Disrupted Node Name field contains a value of "HMS" or "Management Unit." The Connection Result field contains a value of either "Done" or "Failed." The Femtocell-side Connection Data field contains as much connection setup data as necessary for a femtocell, which may include: IP address, port number, point code of SCTP, and TEID of GTP-U. The Femto GW-side Connection Data field contains as much connection setup data as necessary for a femto gateway, which may include: IP address, port number, point code of SCTP, and TEID of GTP-U.

The above session connection request message m2 is transmitted by the control unit 23b upon receipt of a setup completion notice, UE call connection start notice, or all-UE idling notice. The same message m2 may also be transmitted by the HMS 15a when a session connection request is received from the control unit 23b. In the latter case, the femtocell-side connection data and femto GW-side connection data fields are populated with the corresponding values stored in the original session connection request message that has just been received.

FIG. 20 illustrates a data format of a response to a session connection request. The illustrated response message m2r of session connection request is formed from the following data fields: Message Name, Source Node Name, and Connection Result. For example, the Message Name field contains a value of "Response to Session Connection Request." The Source Node Name field contains a value of "HeNB-GW" or "HNB-GW" or "3G Femtocell" or "LTE Femtocell" or "HMS" to indicate the message sender's own node name. The Connection Result field contains a value of either "Done" or "Failed."

FIG. 21 illustrates a data format of a session disconnection request. The illustrated session disconnection request message m3 is formed from the following data fields: Message Name, Transmit Node Name, Femtocell-side Connection Data, and Femto GW-side Connection Data. For example, the Message Name field contains a value of "Session Disconnection Request." The Transmit Node Name field contains a value of "HMS" or "Management Unit." The Femtocell-side Connection Data field contains as much connection setup data as necessary for a femtocell, which may include: IP address, port number, point code of SCTP, and TEID of GTP-U. The Femto GW-side Connection Data field contains as much connection setup data as necessary for a femto gateway, which may include: IP address, port number, point code of SCTP, and TEID of GTP-U.

The above session disconnection request message m3 is transmitted by the control unit 23b upon receipt of a setup completion notice, UE call connection start notice, or all-UE idling notice. The same message m3 may also be transmitted by the HMS 15a when a session disconnection request is received from the control unit 23b. In the latter case, the femtocell-side connection data and femto GW-side connection data fields are populated with the corresponding values stored in the original session disconnection request message that has just been received.

FIG. 22 illustrates a data format of a response to a session disconnection request. The illustrated session disconnection request response message m3r is formed from the following data fields: Message Name, Source Node Name, and Connection Result. For example, the Message Name field contains a value of "Response to Session Disconnection Request." The Source Node Name field contains a value of "HeNB-GW" or "HNB-GW" or "3G Femtocell" or "LTE Femtocell" or "HMS" to indicate the message sender's own node name. The Connection Result field contains a value of either "Done" or "Failed."

FIG. 23 illustrates a data format of a UE call connection start notice. The illustrated UE call connection start notice message m4 is formed from the following data fields: Message Name, Transmit Node Name, Femtocell-side Connection Data, and Femto GW-side Connection Data. For example, the Message Name field contains a value of "UE Call Connection Start Notice." The Transmit Node Name field contains a value of "3G Femtocell" or "LTE Femtocell." The Femtocell-side Connection Data field contains as much connection setup data as necessary for a femtocell, which may include: IP address, port number, point code of SCTP, and TEID of GTP-U. The Femto GW-side Connection Data field contains as much connection setup data as necessary for a femto gateway, which may include: IP address, port number, point code of SCTP, and TEID of GTP-U.

FIG. 24 illustrates a data format of a response to a UE call connection start notice. The illustrated response message m4r of UE call connection start notice is formed from the following data fields: Message Name, Source Node Name, and Connection Result. For example, the Message Name field contains a value of "Response to UE Call Connection Start Notice." The Source Node Name field contains a value of "Management Unit." The Connection Result field contains a value of either "Done" or "Failed."

FIG. 25 illustrates a data format of an all-UE idling notice. The illustrated all-UE idling notice message m5 is formed from the following data fields: Message Name, Transmit Node Name, Femtocell-side Connection Data, and Femto GW-side Connection Data. For example, the Message Name field contains a value of "All-UE Idling Notice" The Transmit Node Name field contains a value of "3G Femtocell" or "LTE Femtocell." The Femtocell-side Connection Data field contains as much connection setup data as necessary for a femtocell, which may include: IP address, port number, point code of SCTP, and TEID of GTP-U. The Femto GW-side Connection Data field contains as much connection setup data as necessary for a femto gateway, which may include: IP address, port number, point code of SCTP, and TEID of GTP-U.

FIG. 26 illustrates a data format of a response to an all-UE idling notice. The illustrated response message m5r of all-UE idling notice is formed from the following data fields: Message Name, Source Node Name, Connection Result. For example, the Message Name field contains a value of "Response to All-UE Idling Notice." The Source Node Name field contains a value of "Management Unit." The Connection Result field contains a value of either "Done" or "Failed."

FIG. 27 illustrates a data format of control messages. The illustrated data format conforms to TR-069 since the 3GPP standards require the HMS 15a and control unit 23b to use TR-069 protocols in their communication. Specifically, FIG. 27 illustrates a data format of Inform message m6 according to TR-069, which applies to the signaling of a session connection request, a response to a session connection request, a session disconnection request, and a response to a session disconnection request.

More specifically, Inform message m6 is formed from the following data fields ("Arguments" in the TR-069 specification): DeviceId, Event, MaxEnvelopes, CurrentTime, RetryCount, and ParameterList. For example, the DeviceId field contains a device identifier of a dual femtocell that supports both the 3G and LTE technologies. The Event field may contain, for example, a value of four to indicate a VALUE CHANGE event. The MaxEnvelopes field is set to a fixed value of one. The CurrentTime field indicates the transmit date and time. The RetryCount field may be set to any values. The ParameterList field is given a value of "Session Connection Request" or "Response to Session Connection Request" or "Session Disconnection Request" or "Response to Session Disconnection Request."

While various messages have been described above, the proposed network system may transmit other messages over new paths according to the present embodiment. Those messages may have any appropriate data format since they are not particularly specified in the 3GPP standards.

Figure 28:
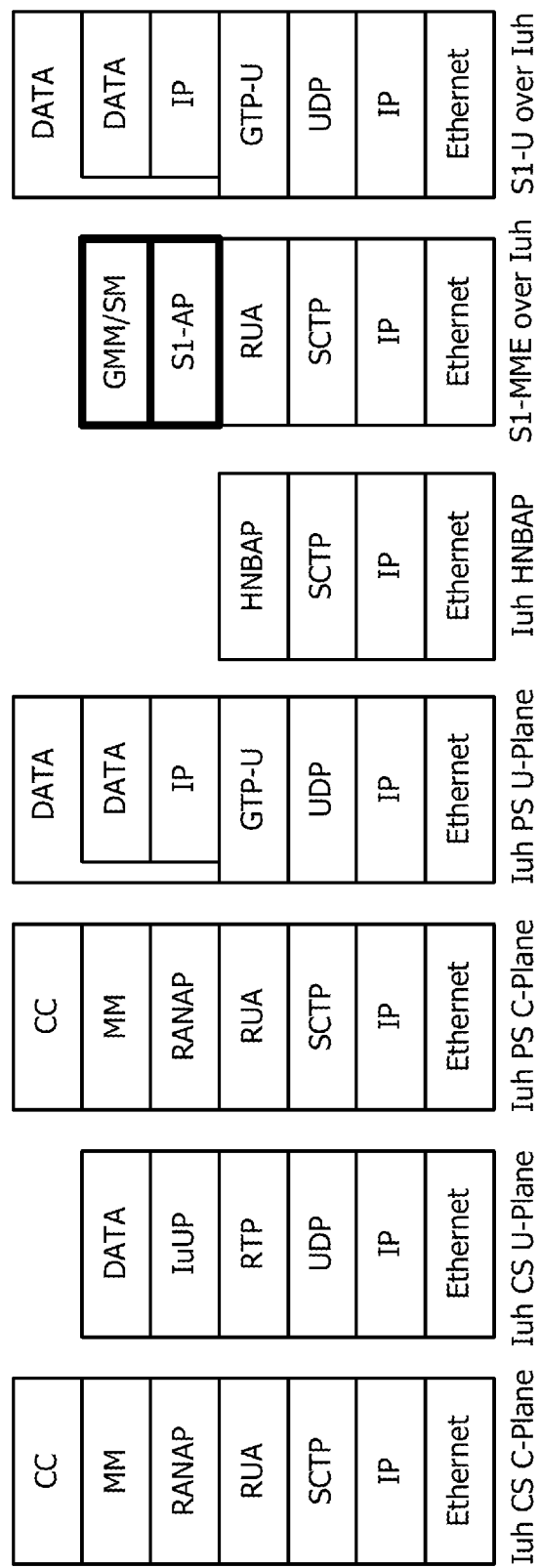
FIG. 28 illustrates protocol stacks of Iuh.

Protocols used in the proposed network system are organized in a layered structure referred to as the protocol stack. For example, FIG. 28 illustrates protocol stacks of Iuh. The bold frames indicate stack elements that are different from existing ones. Iuh interface is organized by the following protocol stacks: Iu-CS C-Plane, Iu-CS U-Plane, Iu-PS C-Plane, Iu-PS U-Plane, Iuh HNBAP, S1-MME over Iuh, and S1-U over Iuh. Here, the protocol stacks of Iu-CS C-Plane, Iu-CS U-Plane, Iu-PS C-Plane, Iu-PS U-Plane, and Iuh HNBAP are similar to those of existing systems.

Specifically, Iu-CS C-Plane and Iu-PS C-Plane are both formed from layers of Ethernet®, IP, SCTP, RANAP User Adaptation layer (RUA), Radio Access Network Application Part (RANAP), Mobility Management (MM), and Call Control (CC) layers in that order, from bottom to top. Iu-CS U-Plane is a stack of layers of Ethernet, IP, User Datagram Protocol (UDP), Real Time Transport Protocol (RTP), Iu User Plane (IuUP), and DATA in that order, from bottom to top. Iu-PS U-Plane and S1-U over Iuh are both formed from the layers of Ethernet, IP, UDP, GTP-U, IP, DATA, and DATA in that order, from bottom to top. Iuh HNBAP is formed from the layers of Ethernet, IP, SCTP, and HNBAP in that order, from bottom to top. S1-MME over Iuh is a stack of layers of Ethernet, IP, SCTP, RUA, S1-AP, and GPRS Mobility Management/Session Management (GMM/SM) in that order, from bottom to top.

Figure 29:
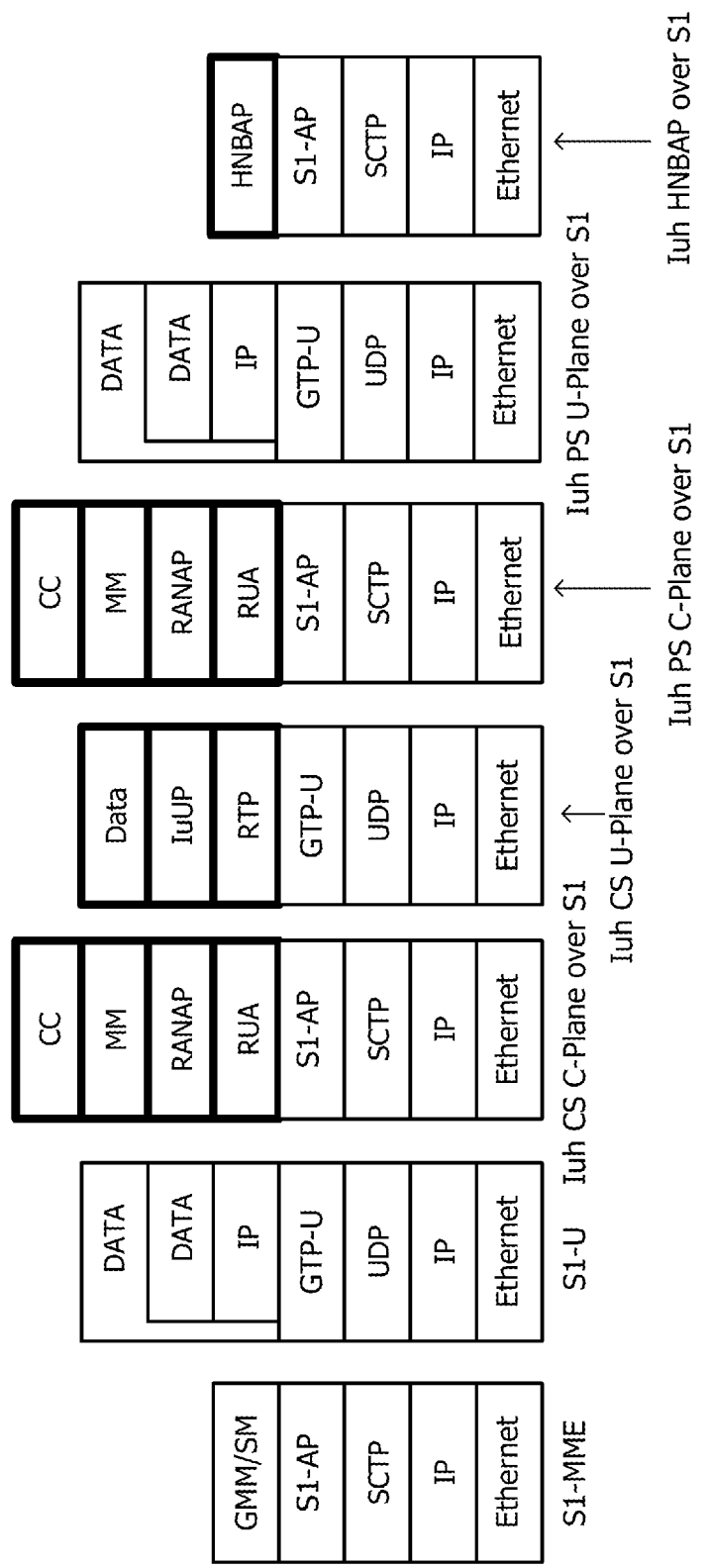
FIG. 29 illustrates protocol stacks of S1.

FIG. 29 illustrates protocol stacks of S1. The bold frames indicate stack elements that are different from existing ones. S1 interface is organized by the following protocol stacks: S1-MME, S1-U, Iuh-CS C-Plane over S1, Iuh-CS U-Plane over S1, Iuh-PS C-Plane over S1, Iuh-PS U-Plane over S1, and Iuh HNBAP over S1. Here, the protocol stack S1-U is similar to that of existing systems, as is Iuh-PS U-Plane over S1.

Specifically, S1-MME is a stack of layers including Ethernet, IP, SCTP, S1-AP, and GMM/SM in that order, from bottom to top. S1-U and Iuh-PS U-Plane over S1 are both formed from the layers of Ethernet, IP, UDP, GTP-U, IP, DATA, and DATA in that order, from bottom to top. Iuh-CS C-Plane over S1 and Iuh-PS C-Plane over S1 are both formed from the layers of Ethernet, IP, SCTP, S1-AP, RUA, RANAP, MM, and CC in that order, from bottom to top. Iuh-CS U-Plane over S1 is a stack of layers including Ethernet, IP, UDP, GTP-U, RTP, IuUP, and DATA in that order, from bottom to top. Iuh HNBAP over S1 is a stack of layers including Ethernet, IP, SCTP, S1-AP, and HNBAP in that order, from bottom to top.

Figure 30:
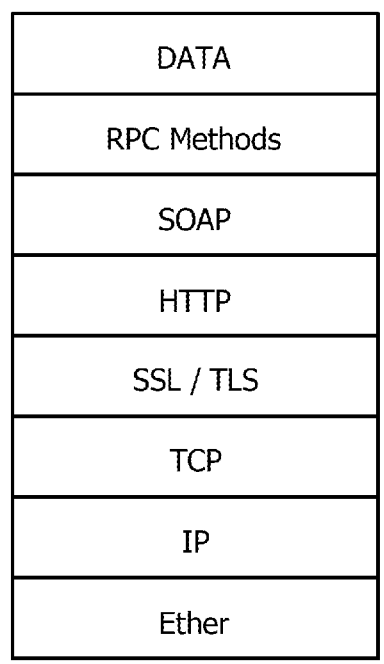
FIG. 30 illustrates a protocol stack of TR-069.

FIG. 30 illustrates protocol stacks of the control interface between the HMS 15a and control unit 23b. This control interface TR-069 is a stack of layers including Ethernet, IP, Transmission Control Protocol (TCP), SSL Protocol Version 3.0/RFC2246—the TLS Protocol Version 1.0 (SSL/TLS), RFC 2616—Hypertext Transfer Protocol (HTTP), Simple Object Access Protocol (SOAP), Remote Procedure Call (RPC) Methods, and DATA in that order, from bottom to top.

Various features of the embodiments have been discussed above. Those features make it possible to reduce the consumption of communication sessions and thus improve the efficiency of communication.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that various changes, substitutions, and alterations could be made hereto without departing from the spirit and scope of the invention.

What is claimed is:

1. A communications system, comprising:
an upper-level apparatus configured to have communication functions for a first communication session and a second communication session, the upper-level apparatus being a mobile communication carrier formed from core network and gateway elements; and
a dual femtocell base station apparatus supporting both 3G and LTE comprising:
a first communication unit configured to communicate with the upper-level apparatus through the first communication session established therewith, the first communication unit communicating with the upper-level apparatus through a 3G communication session,
a second communication unit configured to communicate with the upper-level apparatus through the second communication session established therewith, the second communication unit communicating with the upper-level apparatus through a LTE communication session; and
a communication control unit configured to control the first communication unit and the second communication unit;
wherein the communication control unit disconnects the first communication session and directs a signal intended for the first communication session to the second communication session, so that the signal is delivered to the upper-level apparatus by using the second communication session as a detour,
wherein the signal intended for the first communication session is delivered to the upper-level apparatus by sending the signal to the second communication unit from the first communication unit according to a command from the communication control unit, and then tunneling the signal to the upper-level apparatus through the second communication session.

2. The communications system according to claim 1, wherein the communication control unit reestablishes the disconnected first communication session and stops using the second communication session as a detour of the first communication session, upon initiation of an outgoing call from or reception of an incoming call to a radio communication device under control of the first communication session.

3. The communications system according to claim 1, wherein:
the communication control unit disconnects the first communication session when a radio communication device has returned to an idle state after finishing an outgoing call or an incoming call over the established first communication session; and
the communication control unit disconnects the second communication session when a radio communication device has returned to an idle state after finishing an outgoing call or an incoming call over the established second communication session.

4. The communications system according to claim 1, wherein:
when the first communication session is disconnected, the second communication unit encapsulates a signal intended for the first communication session into a form for transmission to the upper-level apparatus over the second communication session; and
when the second communication session is disconnected, the first communication unit encapsulates a signal intended for the second communication session into a form for transmission to the upper-level apparatus over the first communication session.

5. A dual femtocell base station apparatus supporting both 3G and LTE, comprising:
a first communication unit configured to communicate with an upper-level apparatus through a first communication session established therewith, the upper-level apparatus being a mobile communication carrier formed from core network and gateway elements, and the first communication unit communicating with the upper-level apparatus through a 3G communication session;
a second communication unit configured to communicate with the upper-level apparatus through a second communication session established therewith, the second communication unit communicating with the upper-level apparatus through a LTE communication session; and
a communication control unit configured to control the first communication unit and the second communication unit,
wherein the communication control unit disconnects the first communication session and directs a signal intended for the first communication session to the second communication session, so that the signal is delivered to the upper-level apparatus by using the second communication session as a detour,
wherein the signal intended for the first communication session is delivered to the upper-level apparatus by sending the signal to the second communication unit from the first communication unit according to a command from the communication control unit, and then tunneling the signal to the upper-level apparatus through the second communication session.

6. A communication method executed by a dual femtocell base station apparatus supporting both 3G and LTE to communicate with an upper-level apparatus through communication sessions, the upper-level apparatus being a mobile communication carrier formed from core network and gateway elements, the method comprising:
communicating with the upper-level apparatus through a first communication session established therewith, the first communication unit communicating with the upper-level apparatus through a 3G communication session;
communicating with the upper-level apparatus through second communication sessions established therewith, the second communication unit communicating with the upper-level apparatus through a LTE communication session; and
disconnecting the first communication session right after the dual femtocell base station apparatus is started up or when a radio communication device under control of the first communication session enters an idle state, and directing a signal intended for the first communication session to the second communication session, so that the signal is delivered to the upper-level apparatus by using the second communication session as a detour,
wherein the signal intended for the first communication session is delivered to the upper-level apparatus by sending the signal to the second communication unit from the first communication unit according to a command from the communication control unit, and then tunneling the signal to the upper-level apparatus through the second communication session.

7. A dual femtocell base station apparatus supporting both 3G and LTE comprising:
a first communication unit configured to communicate with an upper-level apparatus through a 3G session over an Iuh interface established therewith, the upper-level apparatus being a mobile communication carrier formed from core network and gateway elements, and the first communication unit communicating with the upper-level apparatus through a 3G communication session;
a second communication unit configured to communicate with the upper-level apparatus through a Long Term Evolution (LTE) communication session established therewith, the second communication unit communicating with the upper-level apparatus through a LTE communication session; and a communication control unit configured to control the first communication unit and the second communication unit, wherein the communication control unit disconnects the 3G session over an Iuh interface and directs a first signal intended for the W-CDMA communication session to the LTE communication session, so that the first signal is delivered to the upper-level apparatus by using the LTE communication session as a detour, and wherein the first signal intended for the 3G session over an Iuh interface is delivered to the upper-level apparatus by sending the first signal to the LTE communication session from the 3G session over an Iuh interface according to a command from the communication control unit, and then tunneling the first signal to the upper-level apparatus through a LTE communication session, wherein the communication control unit disconnects the LTE communication session and directs a second signal intended for the LTE communication session to the 3G session over an Iuh interface, so that the second signal is delivered to the upper-level apparatus by using the 3G session over an Iuh interface as a detour, and wherein the second signal intended for the LTE communication session is delivered to the upper-level apparatus by sending the second signal to the 3G session over an Iuh interface from the LTE communication session according to a command from the communication control unit, and then tunneling the second signal to the upper-level apparatus through the 3G session over an Iuh interface.

8. The dual femtocell base station apparatus according to claim 7, wherein:

the communication control unit reestablishes the disconnected 3G session over an Iuh interface and stops using the LTE communication session as a detour, upon initiation of an outgoing call from or reception of an incoming call to a first radio communication device under control of the 3G session over an Iuh interface; and the communication control unit reestablishes the disconnected LTE communication session and stops using the W-CDMA communication session as a detour, upon initiation of an outgoing call from or reception of an incoming call to a second radio communication device that operates under the LTE communication session.

9. The dual femtocell base station apparatus according to claim 7, wherein:

the communication control unit disconnects the 3G session over an Iuh interface when the first radio communication device has returned to an idle state after finishing the outgoing or incoming call over the 3G session over an Iuh interface that has been established; and the communication control unit disconnects the LTE communication session when the second radio communication device has returned to an idle state after finishing the outgoing or incoming call over the LTE communication session that has been established.

10. The dual femtocell base station apparatus according to claim 7, wherein:

when the 3G session over an Iuh interface is disconnected, the second communication unit encapsulates a signal intended for the 3G session over an Iuh interface into a form for transmission to the upper-level apparatus over the LTE communication session;

when the LTE communication session is disconnected, the first communication unit encapsulates a signal intended for the LTE communication session into a form for transmission to the upper-level apparatus over the 3G session over an Iuh interface.

* * * * *